United States Patent [19]

Rider

[11] Patent Number: 5,133,417
[45] Date of Patent: Jul. 28, 1992

[54] ANGLE SENSOR USING THERMAL CONDUCTIVITY FOR A STEERABLE BORING TOOL

[75] Inventor: Alan J. Rider, Reston, Va.

[73] Assignee: The Charles Machine Works, Inc., Perry, Okla.

[21] Appl. No.: 539,551

[22] Filed: Jun. 18, 1990

[51] Int. Cl.$^5$ .................. E21B 7/04; E21B 47/02
[52] U.S. Cl. ........................ 175/45; 33/366; 175/61
[58] Field of Search ............ 175/45, 61, 73; 33/366, 33/313, 312, 315, 343, 377

[56] References Cited

U.S. PATENT DOCUMENTS

| | | | |
|---|---|---|---|
| 2,658,284 | 11/1953 | Arps | 33/205 |
| 2,936,411 | 5/1960 | Doty | 317/246 |
| 3,172,212 | 3/1965 | Pappas | 33/206 |
| 3,434,219 | 3/1969 | Bowman | 33/205 |
| 3,442,023 | 5/1969 | Remington et al. | 33/366 |
| 3,461,979 | 8/1969 | Newfarmer | 175/45 |
| 3,525,405 | 8/1970 | Coyne et al. | 175/19 |
| 3,529,682 | 9/1970 | Coyne et al. | 175/45 |
| 3,589,454 | 6/1971 | Coyne | 175/26 |
| 3,712,391 | 1/1973 | Coyne | 175/26 |
| 3,786,472 | 1/1974 | Scopacasa | 340/282 |
| 3,906,471 | 9/1975 | Shawhan | 340/200 |
| 4,028,815 | 6/1977 | Buckley et al. | 33/366 |
| 4,167,818 | 9/1979 | Cantarella et al. | 33/366 |
| 4,244,117 | 1/1981 | Cantarella et al. | 33/366 |
| 4,422,243 | 12/1983 | Brunson et al. | 33/366 |
| 4,438,820 | 3/1984 | Gibson | 175/45 |
| 4,452,075 | 6/1984 | Bockhorst et al. | 73/151 |
| 4,493,155 | 1/1985 | Comeau et al. | 33/366 |
| 4,521,973 | 6/1985 | Wiklund et al. | 33/366 |
| 4,528,760 | 7/1985 | Plummer | 33/366 |
| 4,641,434 | 2/1987 | Engler | 33/366 |
| 4,644,662 | 2/1987 | Anderson et al. | 33/366 |
| 4,646,277 | 2/1987 | Bridges et al. | 367/191 |
| 4,672,753 | 6/1987 | Kent et al. | 33/366 |
| 4,674,579 | 6/1987 | Geller et al. | 175/45 |
| 4,682,129 | 7/1987 | Bakermans et al. | 33/184 |
| 4,710,708 | 12/1987 | Rorden et al. | 324/207 |
| 4,714,118 | 12/1987 | Baker et al. | 175/26 |
| 4,779,353 | 10/1988 | Lopes et al. | 33/366 |
| 4,787,463 | 11/1988 | Geller et al. | 175/45 |
| 4,811,491 | 3/1989 | Phillips et al. | 33/366 |
| 4,812,812 | 3/1989 | Flowerdew et al. | 340/854 |
| 4,875,014 | 10/1989 | Roberts et al. | 324/326 |
| 4,907,658 | 3/1990 | Stangl et al. | 175/19 |
| 4,937,518 | 6/1990 | Donati et al. | 324/716 |
| 4,953,638 | 9/1990 | Dunn | 175/45 X |

FOREIGN PATENT DOCUMENTS

| | | |
|---|---|---|
| 0195559 | 9/1986 | European Pat. Off. . |
| 0247799 | 12/1987 | European Pat. Off. . |
| 3615291 | 11/1986 | Fed. Rep. of Germany . |
| 3735585 | 4/1988 | Fed. Rep. of Germany . |
| 63-63913 | 3/1988 | Japan . |
| 1-9309 | 1/1989 | Japan . |
| WO87/04515 | 7/1987 | PCT Int'l Appl. . |
| 8806716 | 9/1988 | PCT Int'l Appl. . |
| 8810408 | 12/1988 | PCT Int'l Appl. ............ 33/366 |
| 8908820 | 9/1989 | PCT Int'l Appl. . |
| WO90/00259 | 1/1990 | PCT Int'l Appl. . |
| 1150352 | 4/1985 | U.S.S.R. .................. 175/45 |
| 2110374 | 6/1983 | United Kingdom .......... 33/366 |
| 2116723 | 9/1983 | United Kingdom . |
| 2175096 | 11/1986 | United Kingdom . |
| 2197078A | 5/1988 | United Kingdom . |
| 2204136A | 11/1988 | United Kingdom . |
| 2220070A | 12/1989 | United Kingdom . |

OTHER PUBLICATIONS

"Extended-Range Horizontal Boring System", Technology Profile, Nov. 1986.
"Horizontal Boring Technology", pp. 1-8, Winter, 1986/1987.

Primary Examiner—Hoang C. Dang
Attorney, Agent, or Firm—Banner, Birch, McKie & Beckett

[57] ABSTRACT

An angle sensor for determining the roll angle of a rotating member is provided. The angle sensor includes an array of paired electrical components, each electrical component having an electrical characteristic which varies as a function of temperature. A fluid responsive to the rotation of the rotating member causes the electrical characteristic of a first one of each pair of electrical components to be different than the electrical characteristic of a second one of each pair of electrical components. A comparator compares the electrical characteristics of the first and second ones of each pair of electrical components to determine the roll angle of the rotatable member.

59 Claims, 16 Drawing Sheets

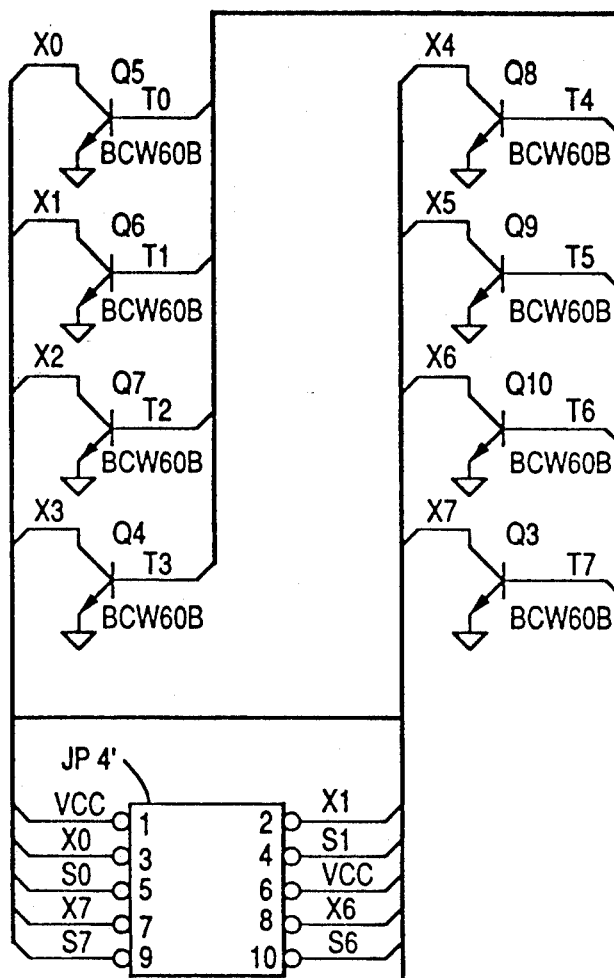
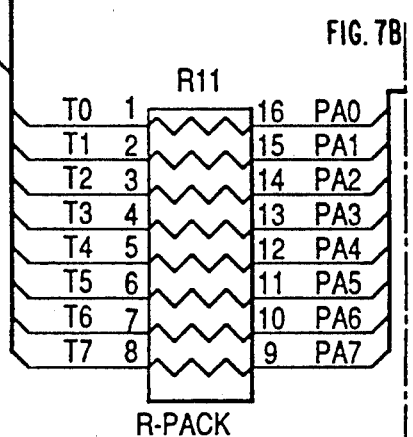
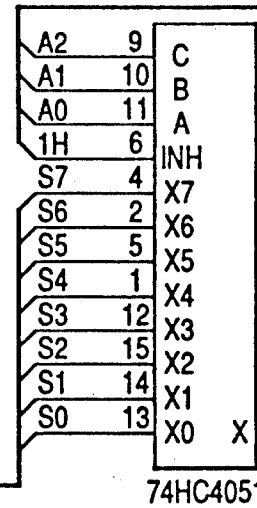
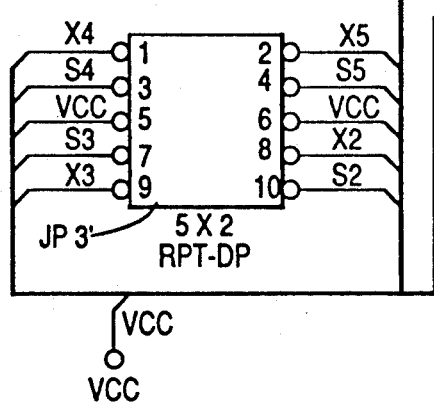
FIG. 7A

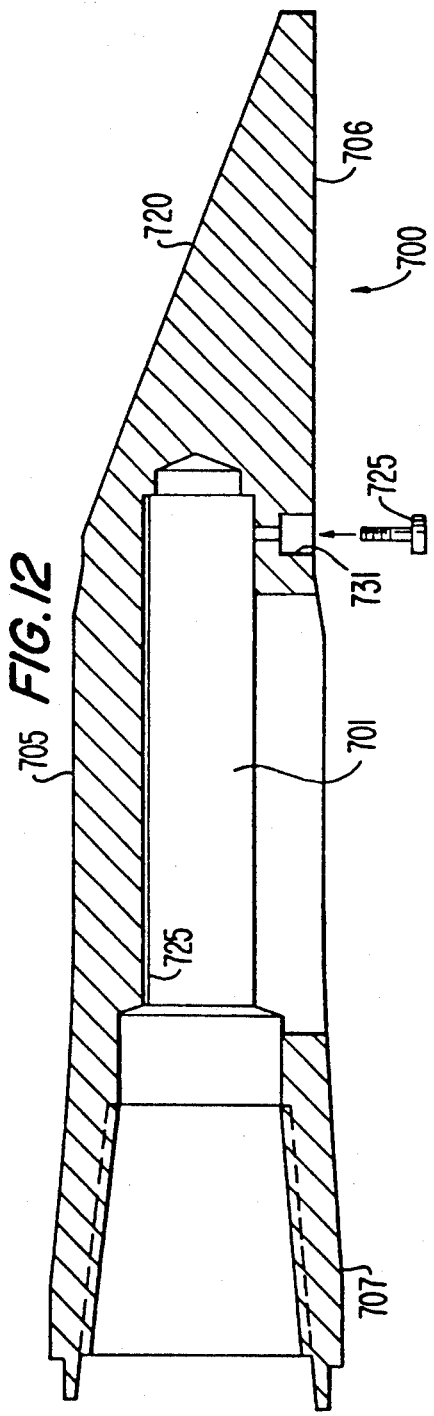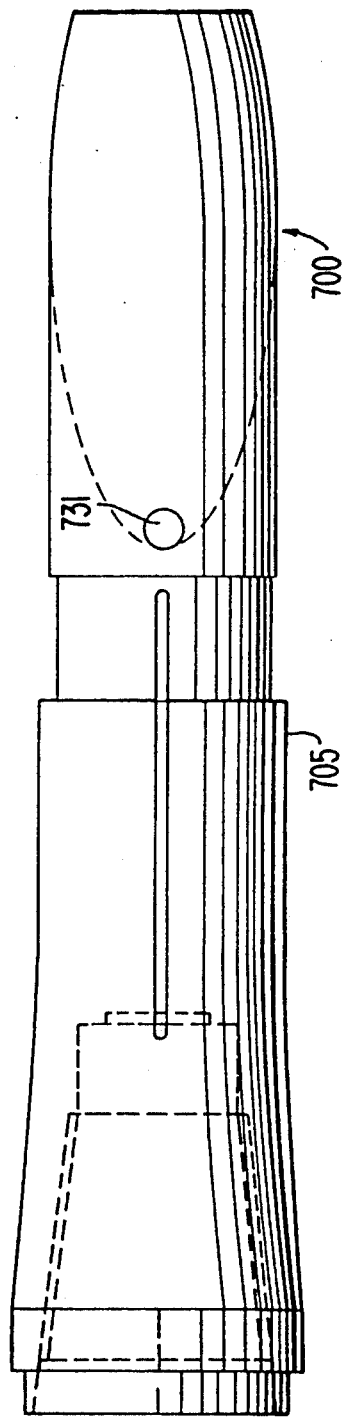

ANGLE SENSOR USING THERMAL CONDUCTIVITY FOR A STEERABLE BORING TOOL

CROSS-REFERENCE TO RELATED APPLICATIONS

The present application is related by subject matter to commonly assigned copending Application Ser. No. 539,699 entitled "Angle Sensor for a Steerable Boring Tool, filed Jun. 18, 1990.

TECHNICAL FIELD

The present invention generally relates to an angle sensor for determining an orientation of a member in a plane and, more particularly, to a roll angle sensor for determining the roll angle of a steerable horizontal earth boring tool.

BACKGROUND OF THE INVENTION

The determination of the presence and location of concealed underground objects, such as gas and water pipes, power cables, and telephone and CATV cables or conduits, is a necessary prerequisite to excavation and/or the laying of new lines or cables. In some applications, an underground steerable boring tool is utilized to form an underground tunnel in which cables, telephone lines, etc. are subsequently positioned. When using such a steerable boring tool, it is important to know the location and orientation of the boring tool relative to underground objects to be able to appropriately steer the boring tool and thus position the new lines or cables to avoid existing lines and cables.

One method of boring is described in commonly assigned, U.S. Pat. No. 4,953,638 (the '638 patent) filed on Jun. 27, 1988, incorporated herein by reference. As generally indicated in FIGS. 1 to 3, the method includes positioning a boring machine on the surface of the earth adjacent a selected borehole entry point. The boring machine includes facilities to axially advance and to selectively rotate a drill string. The present invention, however, is not restricted to the method in the '638 patent, but has broad applicability to other methods as well, such as positioning the boring machine in a subsurface pit. The drill string is typically in the form of a plurality of lengths of pipe which are provided with male threads on a first end and female threads on a second end so that the lengths of pipe may be interconnected together in sequence to provide a drill string. At the end of the drill string, a drill bit as shown in FIGS. 2 and 3 is provided for performing the boring operation. The drill bit includes a blade which is inclined at an angle to the axis of the drill bit string to which the bit is attached. The angled blade of the illustrated drill bit generates a non-axisymmetric resultant force as it is thrusted through the ground, causing it to deviate off a straight line path if the bit is not rotated as it is advanced.

The drill string is simultaneously rotated and advanced by means of the boring machine to establish a borehole in the earth. The drilling operation wherein the pipe is simultaneously rotated and axially advanced is continued until a change in direction of the borehole is desired, such as to avoid a known obstacle or to correct a course deviation. In order to change the direction of the borehole, the following sequence is employed:

1. The rotation of the drill string is stopped.
2. The rotational position of the drill string is oriented so that the drill bit blade is inclined at an angle relative to the axis of the drill string toward the desired new direction of the borehole.
3. The drill string is axially advanced without rotation to axially advance the drill bit a short distance or as far as possible when in difficult drilling conditions such that the blade moves the drill bit in the earth toward the new desired direction.
4. Simultaneous rotation and axial advancement of the drill string may be resumed for a short distance.
5. Sequentially repeating steps 1, 2, 3 and 4 until the direction of the borehole is in the new direction desired. Thereafter, the drill string is axially advanced and simultaneously rotated until it is again desired to change directions. To again change the direction of the borehole, the above sequence is repeated.

Referring to FIG. 1, the above-described technique will be illustrated. The boring machine is generally indicated by the numeral 10 and is shown resting on the earth's surface 12 and in position for forming a borehole 14 underneath an obstruction on the earth such as a roadway 16. Alternatively, the boring machine may be placed in a subsurface pit, as is well-known to those skilled in this technology. As shown in FIG. 1, by using the machine 10 the direction of the borehole can be changed as the borehole passes under roadway 16. This illustrates how the machine 10 can be utilized to form a borehole 14 under an obstruction without first digging a deep ditch in which to place a horizontal boring machine, and, also, without having to dig a deep ditch on the opposite side of the obstruction where the borehole is to be received.

A typical drill bit 58 is illustrated in FIGS. 2 and 3. The drill bit includes a body portion 62 which has a rearward end portion 64 and a forward end portion 66. The rearward end portion 64 includes an internally threaded recess 68 which receives the external threads 70 at the drill string forward end 56. A blade 72 is affixed to body portion 62. The plane of blade 72 is inclined at an acute angle to the axis 74 of the bit. Axis 74 is also the axis of the drill string 44. The blade 72 is preferably sharpened at its outer forward end 72A. When rotated, the blade cuts a circular pattern.

To form a borehole 14 in the earth, the operator attaches the drill pipe and drill bit to the boring machine, begins rotation of the drill pipe and at the same time, causes the boring machine to linearly advance in the travel path of the frame towards the forward end thereof. The drill bit 58, rotating and advancing, enters the earth and forms a borehole therein. As long as the bit 58 is rotated as it is advanced, the borehole generally follows the axis of the drill pipe; that is, the borehole continues to go in the direction in which it is started. When the borehole is started at the earth's surface to go under an obstruction such as a highway, the borehole must first extend downwardly beneath the roadway. When the borehole has reached the necessary depth, the operator must then change the direction of drilling so as to drill horizontally. This can be accomplished in the following way. When it is time to change direction, the operator stops drilling and rotates the drill string so that the drill bit blade 72 is oriented in a desired direction. In the situation illustrated in FIG. 1, the direction of the borehole is first changed so that instead of being inclined downwardly, it is horizontal. To effect such a change in direction, the operator will rotate the drill string until an indicator indicates that the blade 72 is facing downwardly as in FIG. 3, so as to cause the drill bit to be deflected upwardly when advanced without rotation.

With rotation stopped and the blade properly oriented, the operator causes the drill machine to move forward without rotating the drill pipe. After forcing the bit as far as possible, the operator may begin rotation of the drill bit and continue to advance the drill string for a short distance. This facilitates the turning process in some soils. The procedure may be sequentially repeated until the direction of drilling has changed to that which is desired. After the borehole has been oriented in the desired direction, such as horizontal, the drilling can continue by simultaneous rotation and advancement of the drill string, adding new lengths of drill pipe as necessary until it is again desired to change direction of drilling.

Other boring techniques are also commonly utilized. For example, in a percussive mole such as shown in U.S. Pat. No. 4,907,658 to Stangl et al. which is incorporated herein by reference, the forward or boring end generally includes an anvil which is hit by an internal striker powered by compressed air. Generally, the rearward end of the mole is connected to a whip hose which in turn is connected to a flexible air hose connected to a source of compressed air on the surface. The percussive mole can also be adapted to both push or pull pipes through the ground.

As discussed above, the orientation of the angled blade of the drill bit determines the direction in which the boring tool will advance when it is thrusted through the ground without rotation. Thus, in order to appropriately steer boring tools such as those described above in a particular direction, the orientation of the angled blade must be known accurately. Additionally, this angular orientation information must be effectively presented to the operating crew in order to permit efficient underground boring to be carried out.

The prior art contains a number of techniques of determining this angular orientation information. U.S. Pat. No. 4,714,118 to Baker et al., for example, discloses a method and apparatus for monitoring the rool angle of a boring device. The arrangement includes a cylindrical support housing and an electrical resistor element mounted concentrically about an inner surface of the housing. The resistor element forms part of an overall potentiometer which also includes a brush or contact member extending radially from and mounted to a support arm. As the boring device rotates, the resistor element rotates relative to the brush, thereby increasing or decreasing the resistance of the potentiometer. This permits a determination of roll angle in accordance with the resistance.

Another prior art roll sensor is disclosed in U.S. Pat. No. 4,672,753 to Kent. This type of sensor provides 360° of roll angle indication but does not lend itself to miniaturization and is difficult to manufacture.

Another means of indicating roll angle utilizes one or more mercury switches. Such a roll sensor typically can provide only one or two position indications within 360° of rotation. Therefore, actual tool face positioning for a desired steering direction must be relative to one of these positions. This is accomplished by marking the drill string and rotating the desired amount therefrom. Since the actual tool face angle cannot be measured (unless the desired tool face angle happens to coincide with a position where the mercury switch is in the ON position), errors can occur due to the incorrect marking of the reference position, incorrect amount of rotation therefrom, or from windup in the drill string. Additionally, creating a narrow ON position with a mercury switched device creates manufacturing difficulties. Further, these switches exhibit inconsistent operation when subjected to vibration or when inclined more than 10-20 degrees from the horizontal as might occur when boring down a steep hill.

Mechanical systems for determining the orientation, or roll angle, of the blade have physically marked the position of the blade on a first length of drill pipe. As each successive length of drill pipe is added, a corresponding mark is placed on the drill pipe. This process is cumbersome, time-consuming, and inaccurate.

In order to appropriately steer a boring tool in a particular direction, an operator must be alerted that the drill is not on the proper course due to obstacles. While electromagnetic locating techniques may be used to effectively map out underground obstacles such as pipes and cables, other obstacles such as rocks and tree roots are often not discernible from a visual inspection of the surface features and cannot be located using electromagnetic techniques. An operator must nonetheless be made aware of such obstacles and counteract their effect on the drill bit in order that the borehole does not deviate off the intended path and the boring equipment is not damaged. Thus, it would be desirable to provide a device which alerts an operator that the drill is being deflected off course by metallic obstacles as well as rocks and/or roots. Such a tracking or location system would allow the operating crew to determine the location and depth of the drill bit relative to a desired path for the bore and to orient the bit to maintain this path whenever deviations occur.

SUMMARY OF THE INVENTION

Accordingly, it is an object of the present invention to provide an angle sensor which provides an accurate determination of an orientation of a rotatable member.

It is further object of the present invention to provide an angle sensor which provides an accurate determination of an orientation of a member despite being subject to shock vibration severe environmental conditions, and steep pitch angles.

It is a further object of the present invention to provide an angle sensor which is simple to manufacture and easy to operate.

In accordance with the present invention, an angle sensor is provided for determining an orientation of a member in a plane. The angle sensor includes an array of paired electrical elements which have a predetermined relationship to the orientation of the member in the plane. A fluid responsive to movement of the member varies an electrical characteristic of a first one of at least one pair of electrical elements relative to a second one of the at least one pair of electrical elements. A sensing circuit senses the electrical characteristics of at least one electrical element of each pair of electrical elements to determine the orientation of the member in the plane in accordance with the electrical characteristics of the electrical elements sensed by the sensing circuit and the predetermined relationship of the electrical elements to the orientation of the member in the plane.

Also in accordance with the present invention, a sensing device for determining the orientation of a member is provided. The sensing device comprises at least two angle sensors, each angle sensor comprising an array of paired electrical elements which have a predetermined relationship to the orientation of the member in a respective plane. A liquid responsive to the movement of the member varies an electrical characteristic of a first one of at least one pair of electrical elements relative to a second one of the at least one pair of electrical elements. A sensing circuit senses the electrical characteristic of at least one electrical element of each pair of electrical elements such that the orientation of the member in the respective planes may be determined.

Also in accordance with the present invention, a method of determining an orientation of a member in a plane is provided. First, an array of paired electrical elements is arranged so as to have a predetermined relationship to the orientation of the member in the plane. An electrical characteristic of a first one of at least one pair of electrical elements is varied relative to an electrical characteristic of a second one of the at least one pair of electrical elements in response to movement of the member. The electrical characteristic of the first one of each pair of electrical elements and the electrical characteristic of the second one of each pair of electrical elements is then compared. The orientation of the member is then determined in accordance with the comparisons and the predetermined relationship of the electrical elements to the orientation of the member.

Also in accordance with the present invention, a method of determining the orientation of a member is provided. First, at least two arrays of paired electrical elements are arranged so as to have a predetermined relationship to the orientation of the member in respective planes. An electrical characteristic of a first one of at least one pair of electrical elements is varied relative to a second one of the at least one pair of electrical elements in each of the arrays of paired electrical elements in response to movement of the member. The electrical characteristic of the first one of each pair of electrical elements and the electrical characteristic of the second one of each pair of electrical elements in each of said arrays of paired electrical elements is then compared. The orientation of the member is determined in accordance with the comparisons and the predetermined relationship of the electrical elements to the orientation of the member in the respective planes.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIGS. 7A-7E are a schematic diagram of a transmitter for use with the angle sensor of the present invention.

FIG. 12 is a cross-sectional view of a steerable drill bit within which the transmitter housing of FIG. 10 is disposed.

FIG. 13 is a top plan view of the steerable drill bit of FIG. 12.

DETAILED DESCRIPTION OF THE PREFERRED EMBODIMENT

Although the present invention is discussed below in terms of an angle sensor for a steerable boring tool, the invention is more broadly concerned with sensors which determine the direction of gravitational acceleration. Such sensors may be referred to as gravitational encoders. An angle sensor in accordance with a preferred embodiment of the present invention is utilized to determine the direction of gravitational acceleration relative to an array of sensing elements in a transmitter which is mounted in or behind a steerable horizontal earth boring tool. In certain applications, sensing is only required relative to the roll axis of the boring tool and thus the angle sensor is typically referred to as a roll angle sensor. The roll axis is defined as either the rotational centerline of the boring tool or the centerline of the drill string. In typical applications, these centerlines coincide although some offset in order to accommodate the sensors and their associated circuitry is acceptable. The roll angle sensor is installed in the steerable boring tool in such a way that the sensing elements thereof are in known, fixed relationship with the steering feature of the boring tool, typically the drill bit blade or tool face. Thus, the sensor can be used to determine tool face angle relative to the direction of gravity.

Figure 4:
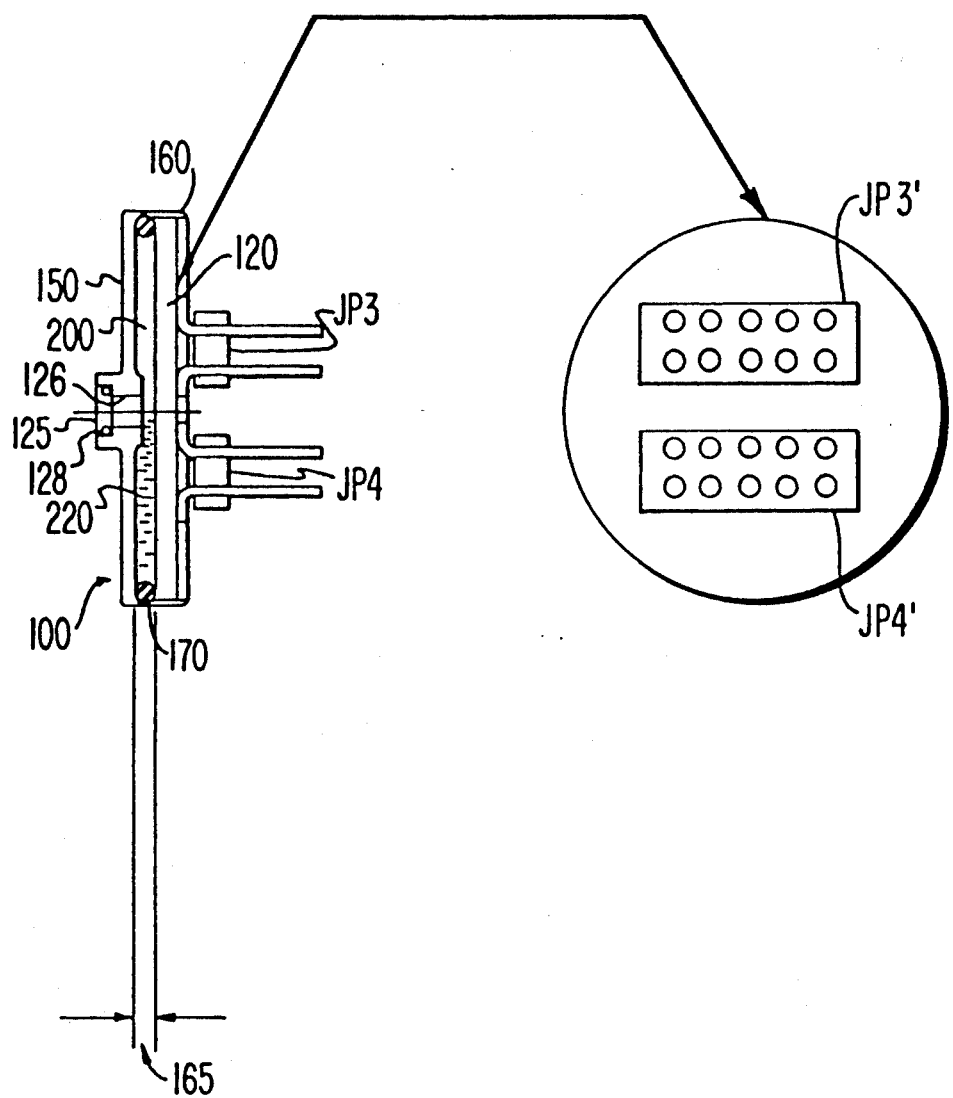
FIG. 4 illustrates an angle sensor in accordance with the present invention and its connecting relationship with the transmitter connectors.
Figure 5:
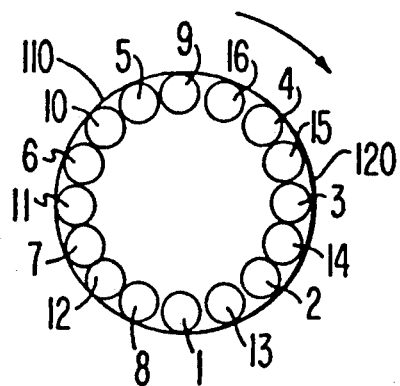
FIG. 5 illustrates an array of thermistors arranged on a printed circuit board.

As discussed above, it is important that an operator have the capability of quickly and accurately determining the orientation of a drill bit blade or tool face in order to appropriately steer a boring tool. The ability to quickly determine the orientation reduces the time needed to form the borehole. The ability to accurately determine the orientation also enables the operator to better control the path followed by the boring tool. The present invention uses a roll sensor 100, as shown in FIGS. 4 and 5, for example, mounted in the drill bit and having a fixed and known relation to the drill bit blade. Roll sensor 100 provides a direct and accurate indication of the orientation of the blade to the operator through the use of associated transmitter and receiver elements described below.

A sensor in accordance with a first embodiment of the present invention will be described with reference to FIGS. 4 and 5. The sensor 100 includes sixteen identical electrical elements 110 which are arranged in a circular array on printed circuit board (PCB) 120, each electrical element having an electrical characteristic which varies as a function of temperature. Preferably, PCB 120 is a circular disc which is approximately one inch in diameter, although it will be readily appreciated that the physical characteristics of the sensor will vary in accordance with the apparatus in which the invention is implemented. In a preferred embodiment, the electrical elements comprise thermistors whose resistance varies as a function of temperature, although the invention is not limited in this respect. Each of the thermistors preferably has a negative temperature coefficient. Alternatively, thermocouples or other sensing elements having a positive or negative temperature coefficient may be utilized. Cup-shaped member 150 is placed over the thermistors and attached to printed circuit board 120 by crimping the outer peripheral edges of cup-shaped member 150 over the outer edge of PCB 120 as indicated at 160 and sealing the resultant structure with a silicone greased elastomeric O-ring 170. The separation 165 between the inner planar surface of cup-shaped member 150 and the inner planar surface of PCB 120 is approximately 50 to 60 thousandths of an inch. Cup-shaped member 150 and printed circuit board 120 define an interior space 200 which is approximately half filled with a fluid generally indicated at 220, such as 3M® Fluorinert® FC-40® Electronic Liquid. In general, liquids having high thermal conductivity and which are chemically inert may be utilized. The amount of fluid utilized is not critical. An opening 126 is provided as a fill hole and is sealed by screw 125 and elastomeric O-ring 128. As illustrated in FIG. 4 and discussed in greater detail below, sensor 100 is coupled via male connectors JP3 and JP4 to female connectors JP3' and JP4' of transmitter 600 as shown in FIG. 7. Transmitter 600 includes sensor control and data acquisition circuitry as further detailed in FIG. 7.

FIG. 5 illustrates the array of thermistors 110 as arranged on PCB 120. The thermistors have been denoted by numbers 1-16 to facilitate reference thereto.

Figure 6:
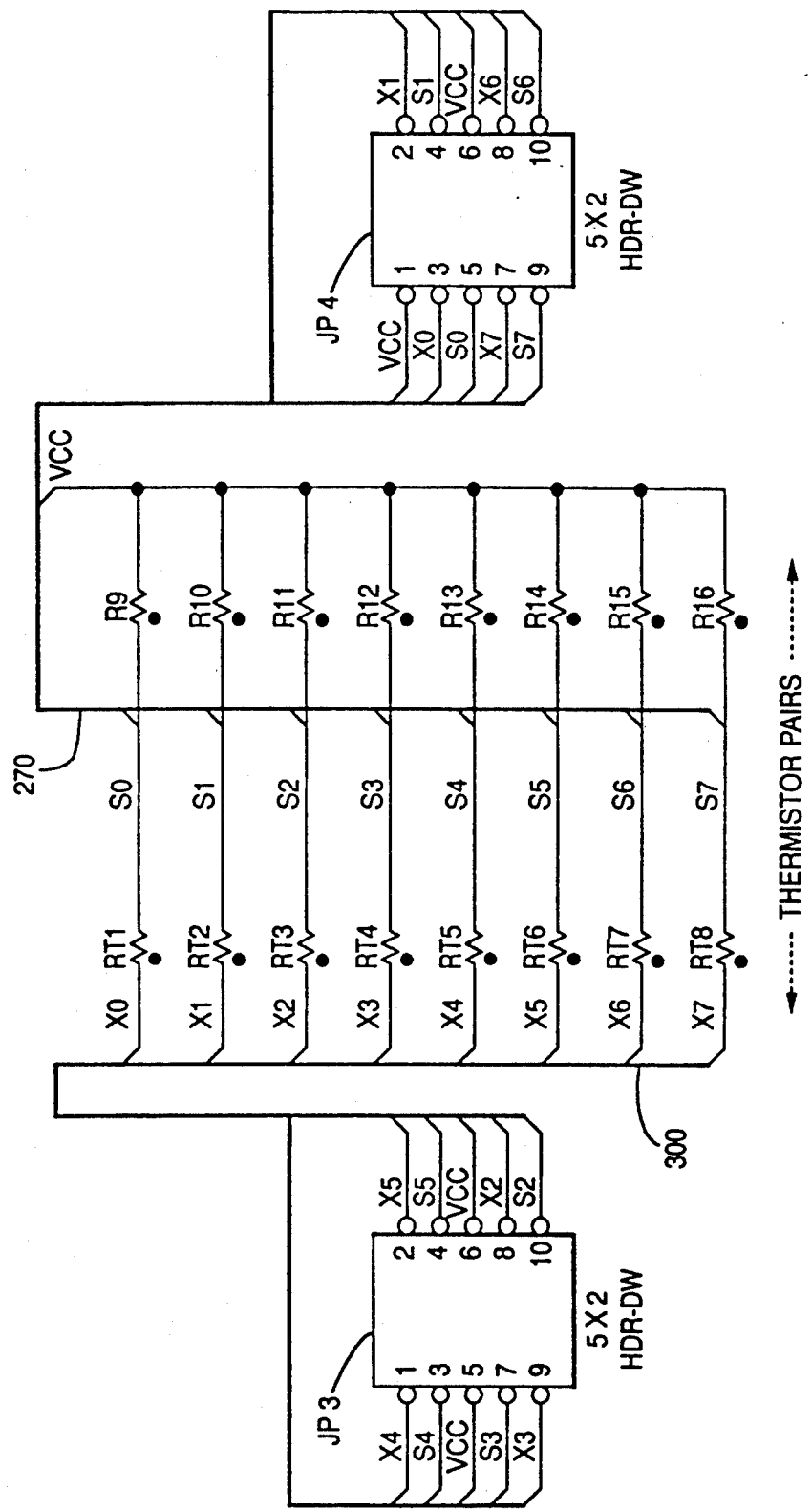
FIG. 6 is a schematic diagram of the angle sensor of FIGS. 4 and 5.
Figure 7B:
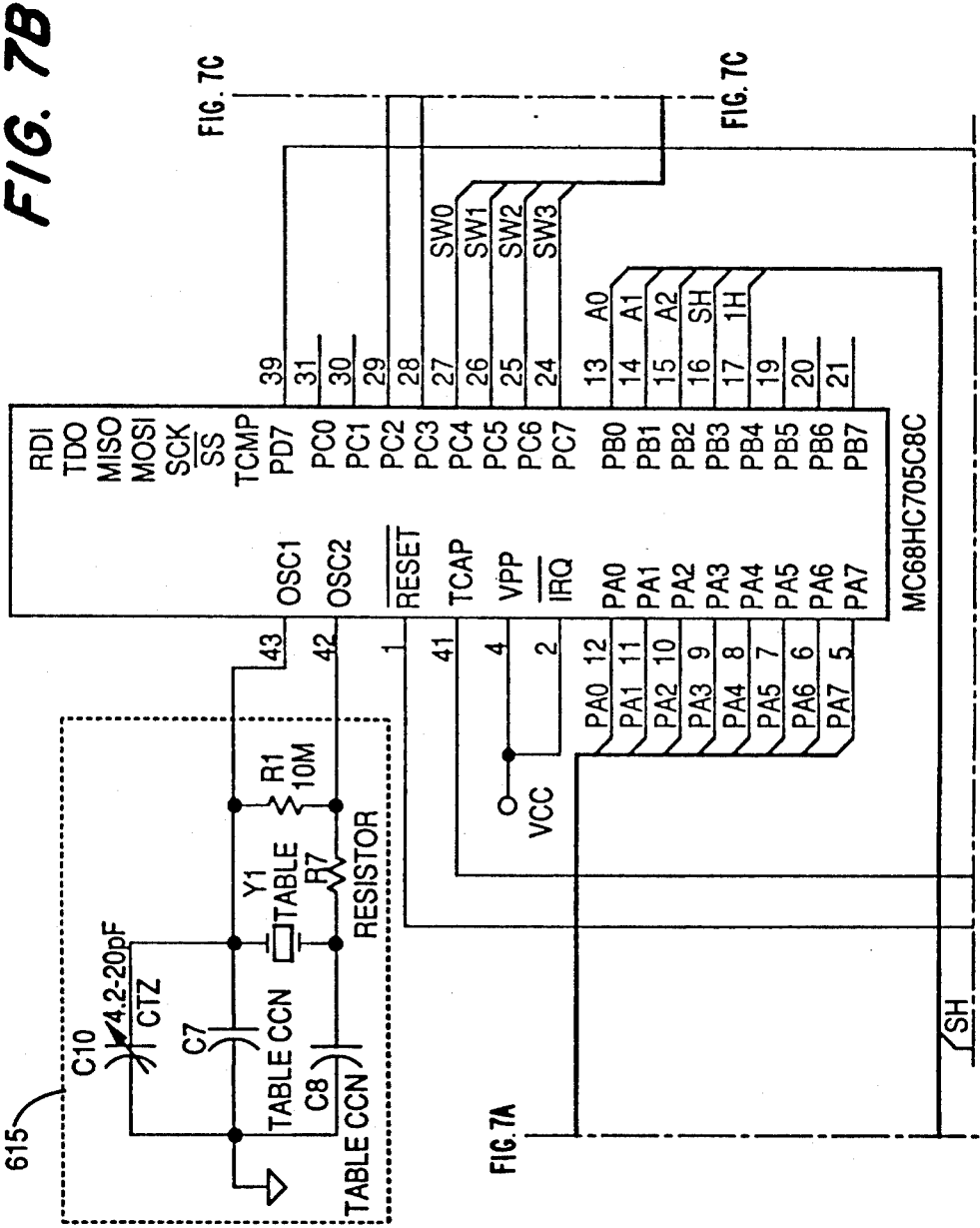
Figure 7C:
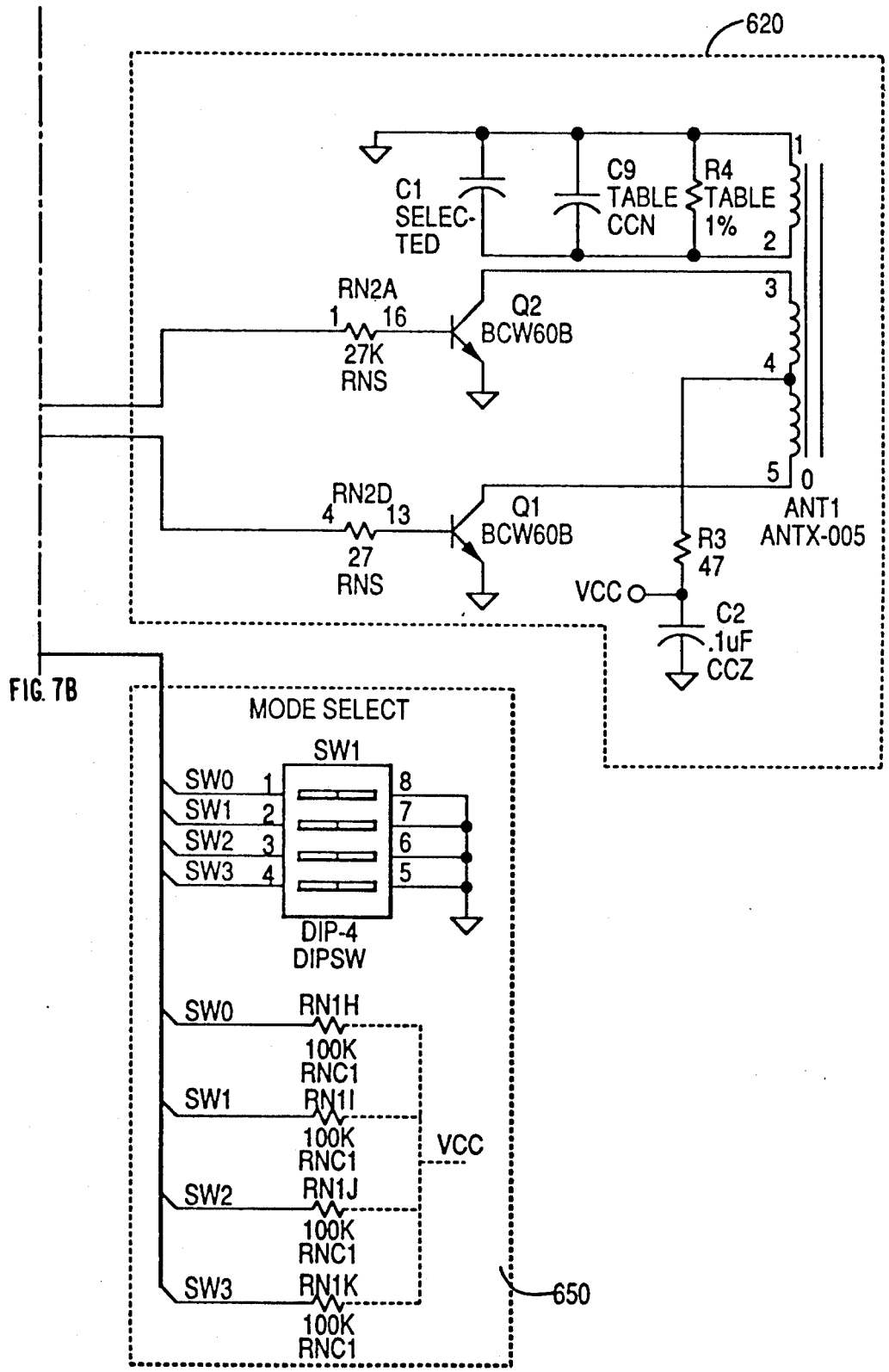
Figure 7D:
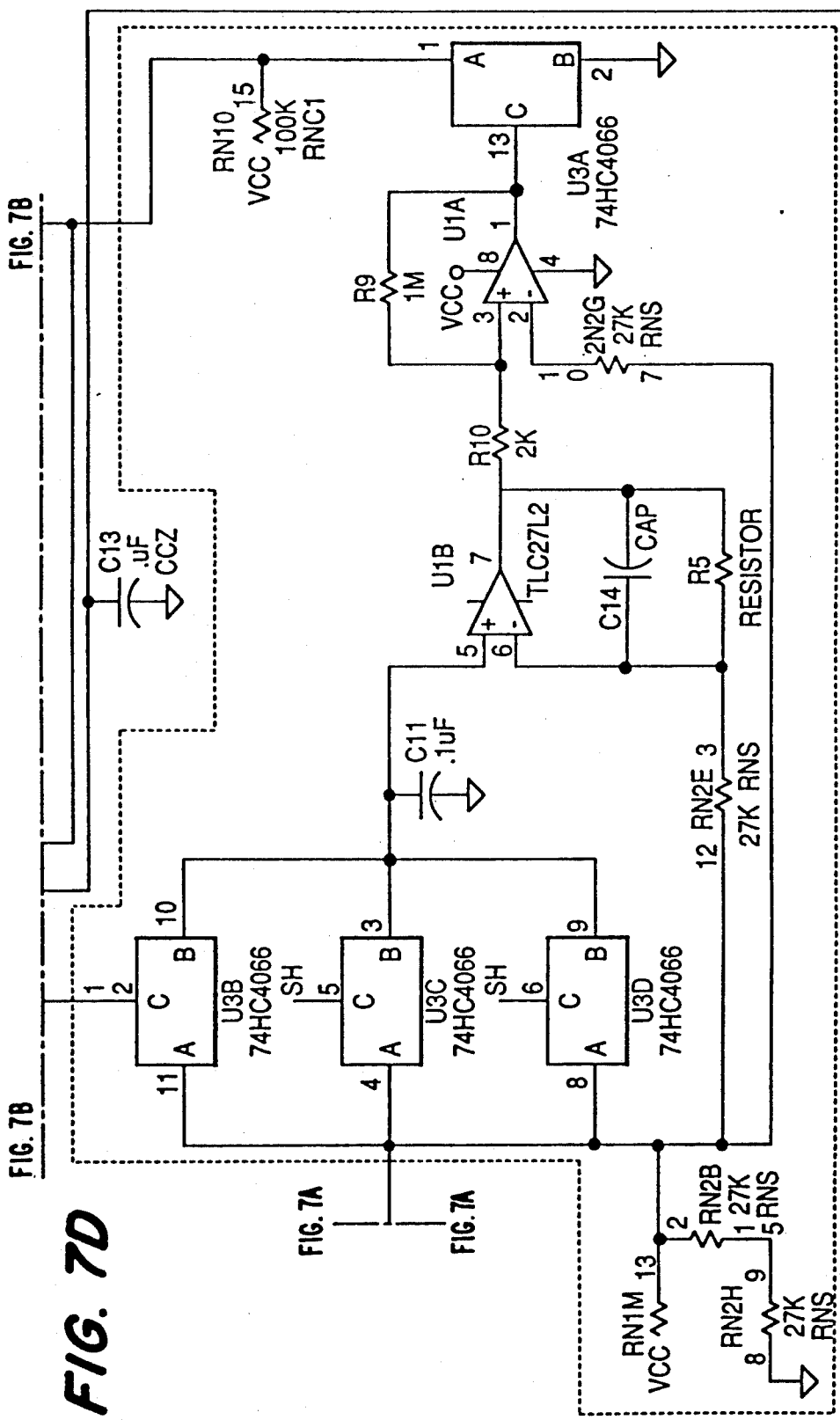
Figure 7E:
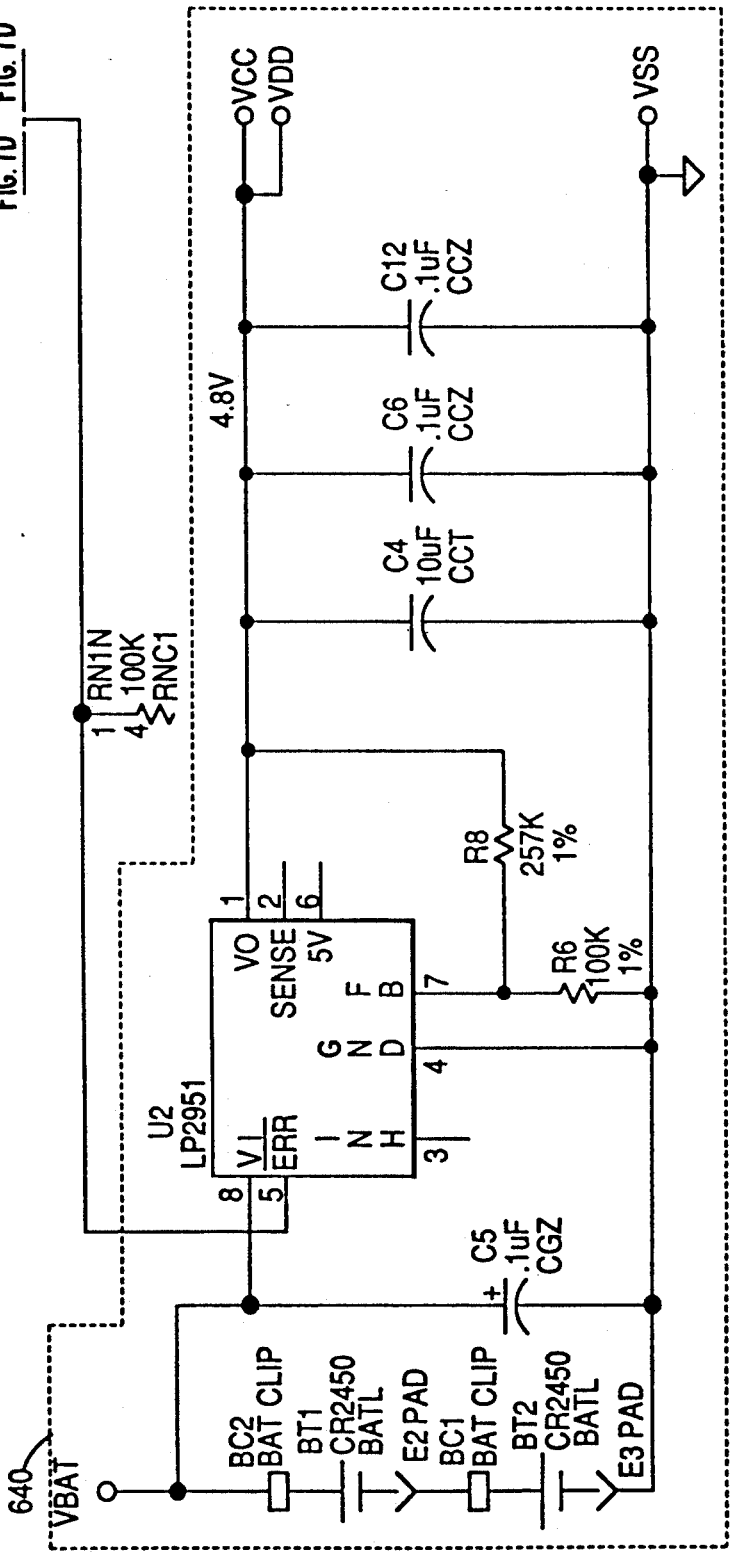

FIG. 6 is a schematic diagram of the angle sensor of FIGS. 4 and 5. Diametrically opposed pairs of thermistors are coupled together as shown. More specifically, thermistor RT1 is coupled to thermistor RT9, RT2 is coupled to RT10, . . . and RT8 is coupled to RT16. Although a currently preferred embodiment utilizes sixteen electrical elements such as thermistors the invention is not limited in this respect. In general, any even number of electrical elements may be utilized, diametrically opposed electrical elements being coupled together as a pair. As discussed below, ascertaining which of the electrical elements are covered by fluid 220 enables the roll angle to be determined. In general, the more electrical elements utilized, the more precisely the roll angle may be determined. For example, the use of four thermistors yield a precision of 90° (±45°), sixteen thermistors 22.5°(±11.25°), etc.

A first end of each thermistor pair is connected to voltage VCC. A junction between each pair of thermistors is coupled to a connector such as JP4 and a second end of the thermistor pair is also coupled to a connector such as JP3. The angle sensor is coupled to control circuitry such as transistors Q3 through Q10 and multiplexer U5 of FIG. 7 via the designated lines and through JP3 and JP4 as well a corresponding transmitter connectors JP3' and JP4'.

FIG. 7 is a schematic diagram of a beacon transmitter 600 which may be utilized with the present invention. Beacon transmitter 600 is intended to be merely illustrative of a transmitter for use with the present invention. Details of transmitter 600 are described in commonly assigned copending Application Ser. No. 539,851 entitled "An Improved System For Locating Concealed Underground Objects" expressly incorporated herein by reference thereto, and will only be outlined below. The beacon transmitter of FIG. 7 performs two functions. First, it broadcasts a 29,430 Hz electromagnetic field signal to provide accurate tool location. Second, it determines the roll angle of the boring tool relative to gravity and broadcasts the angle via a digital communication system to a compatible receiver. The operation of the beacon transmitter is under the control of a micro-controller such as a Motorola MC68HC705. The micro-controller further controls the operation of the angle sensor and generates the digital signals for transmitting the angle information to the receiver. It will be apparent to those skilled in the art that alternative transmitter designs may be utilized in order to perform these functions. The beacon transmitter described below is the preferred embodiment for transmitting the angle information to a receiver, but the invention is not limited to a particular transmitter for performing this function.

Oscillation circuitry 615 including a crystal is coupled to inputs OSC1 and OSC2 of microcontroller U4 for timing and carrier generation purposes. The 29.43 KHz electromagnetic field signal and the angle information is output via PC2 and PC3 to an antenna through output section 620. Angle sensor 100 is interfaced to beacon transmitter 600 at JP3' and JP4'. Power supply 640 supplies the power and the necessary operating voltages for the operation of the beacon transmitter 600. Input section 650 comprises a plurality of DIP switches which may be used to set selected inputs of micro-controller U4. The input DIP switches may be used, for example, to configure the transmitter to only generate the electromagnetic field signal, or to generate the electromagnetic field signal and transmit angle information. The DIP switches may also be used to configure a duty cycle such that the transmitter transmits for a given period and then "sleeps" or is turned off for a given period in order to conserve battery power. For example, the unit may be programmed to transmit for nine hours and then sleep for fifteen hours. The micro-controller may also test the operation of the angle sensor in accordance with a particular setting of the DIP switches. Such procedures may for example include polling the sensor elements to determine whether they are active.

Figure 8A:
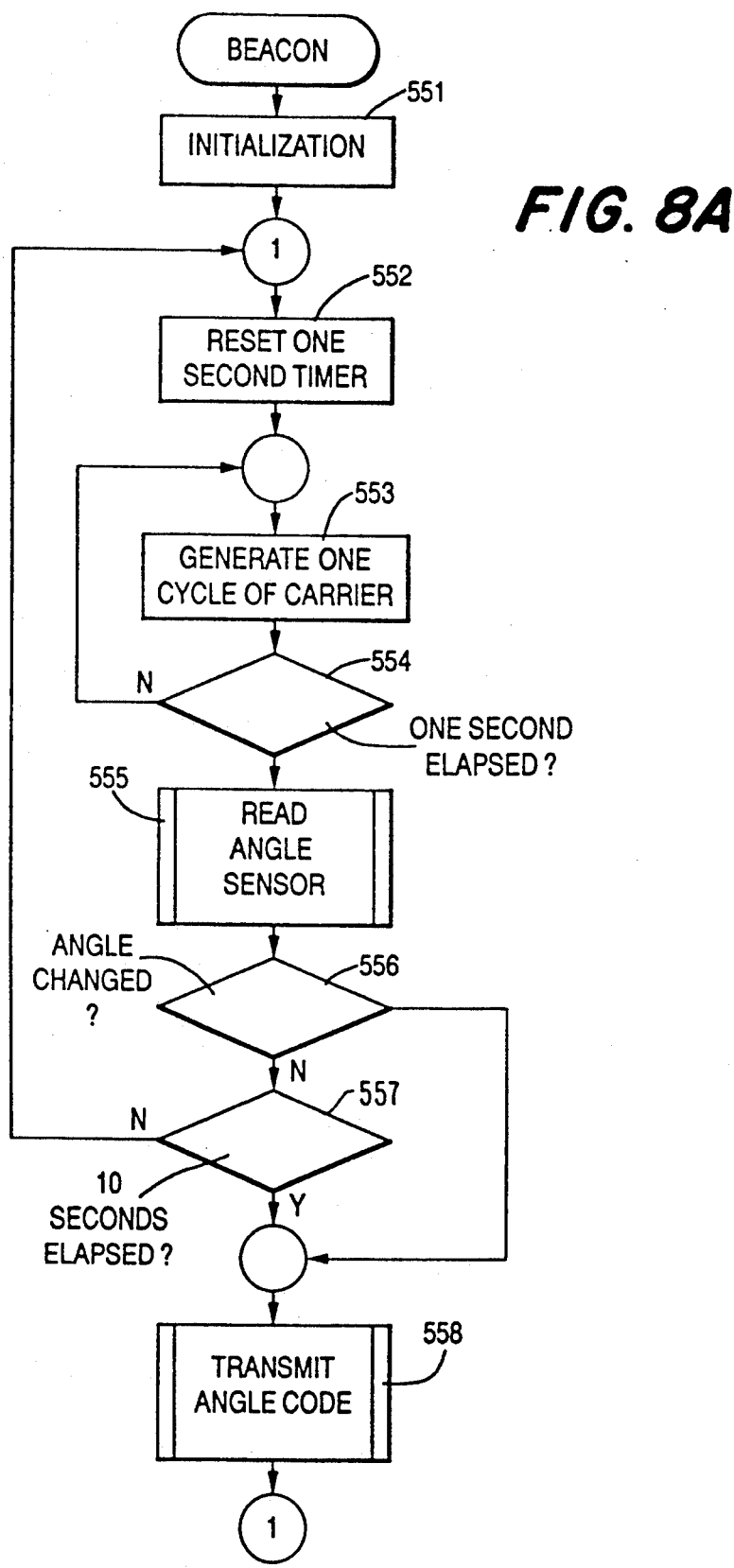
FIGS. 8A-8D are flow charts illustrating steps executed in determining a roll angle of a boring tool.
Figure 8B:
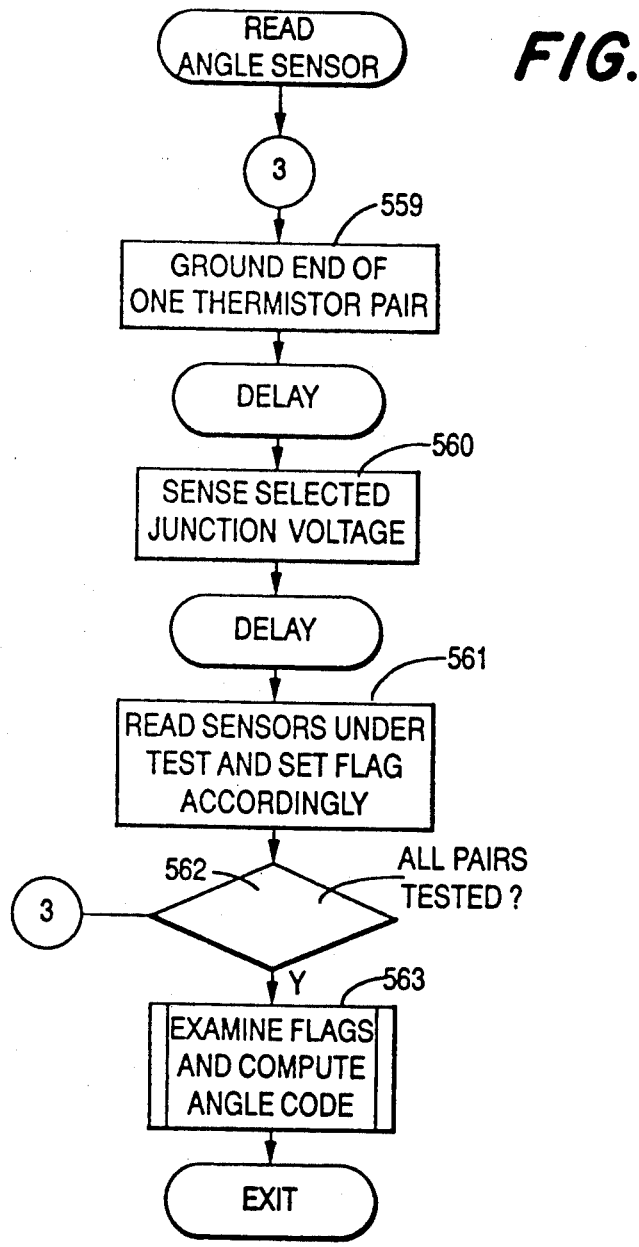
Figure 8C:
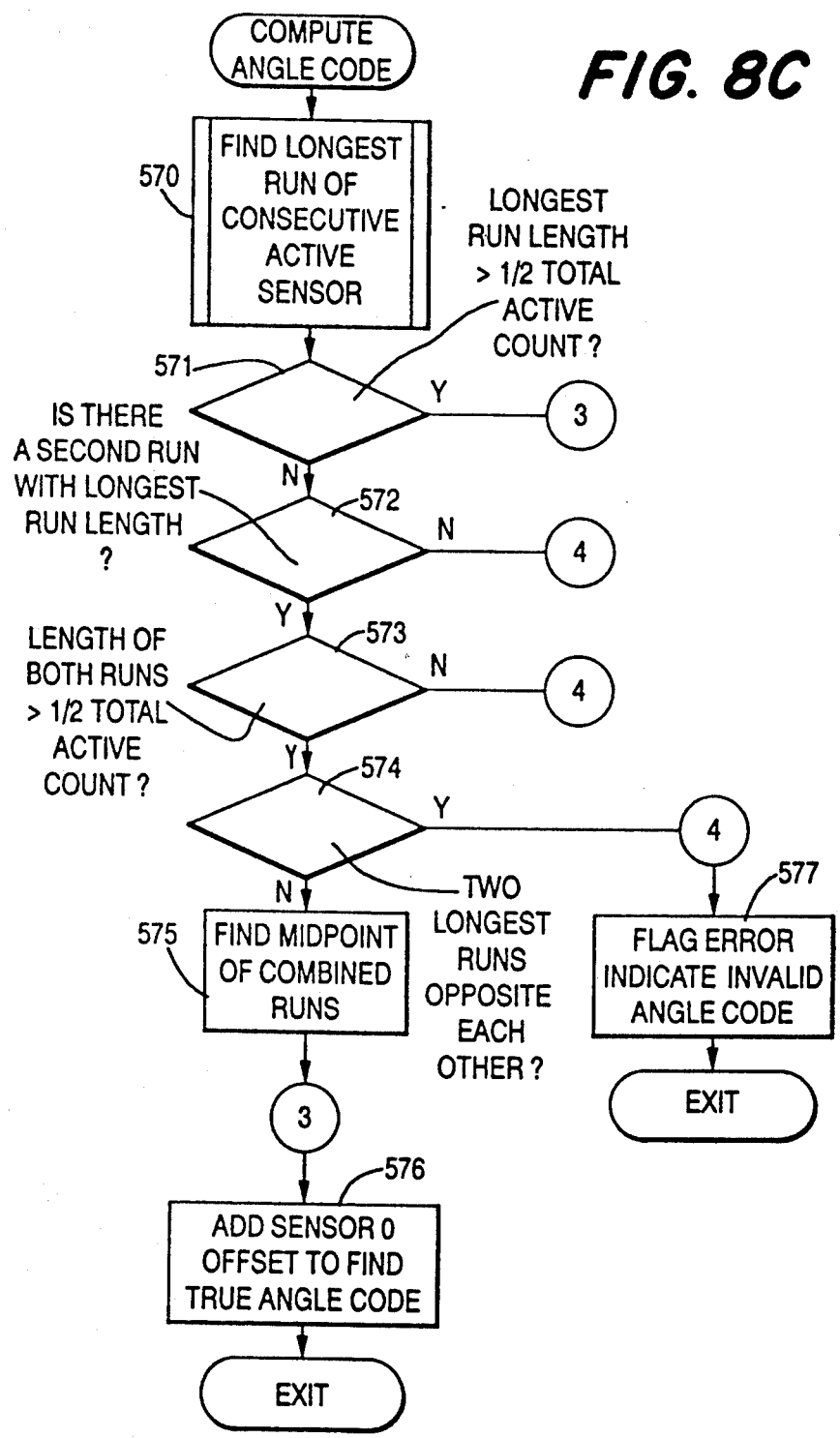
Figure 8D:
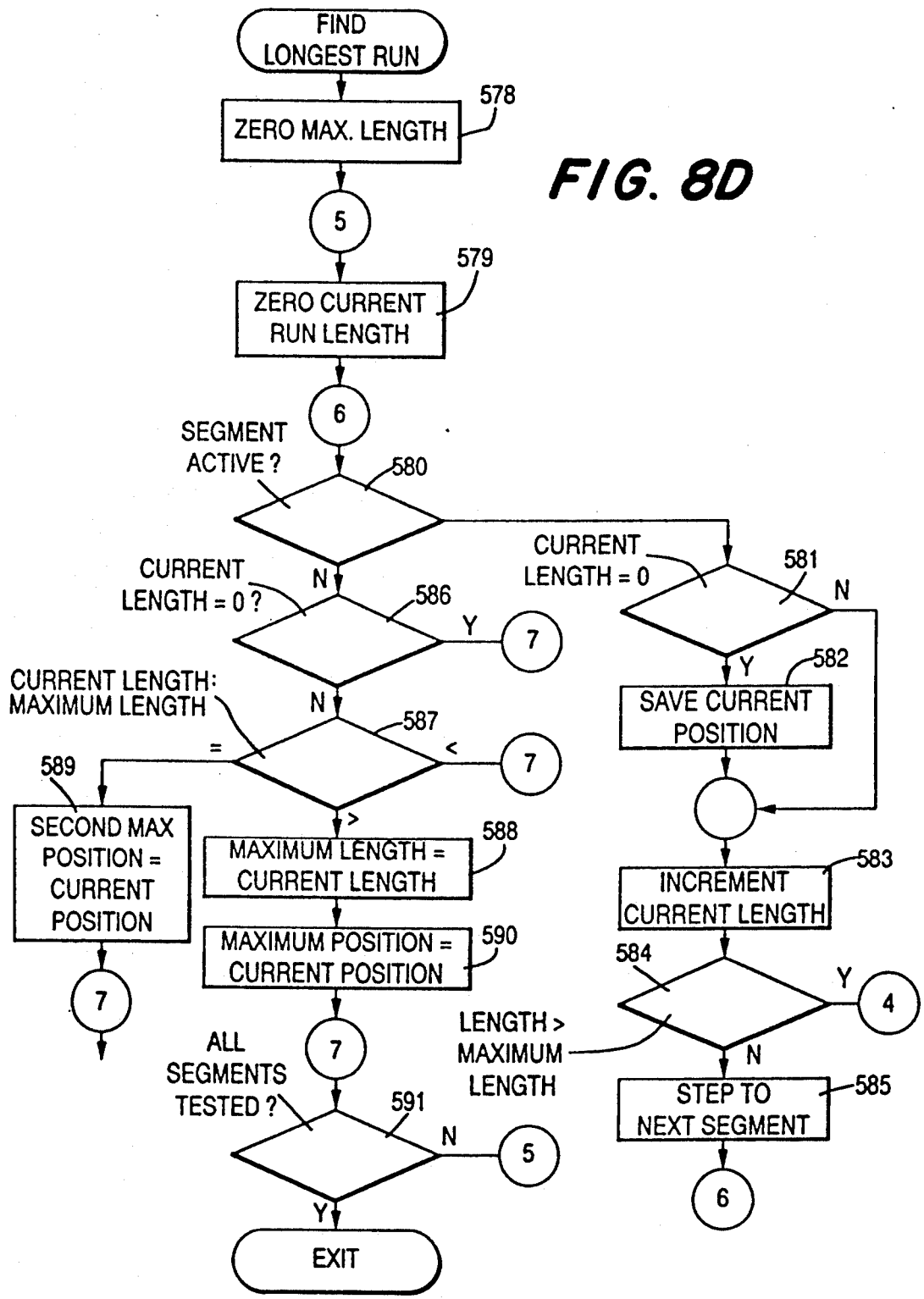

The microcontroller clock is 2 MHz and the carrier frequency is 29.43 kHz. The digital communication system bit rate [BAUD] is 75 Hz. As shown in the flow chart of FIG. 8A, micro-controller U4 samples the angle sensor at one second intervals. That is to say after initialization procedures (551) including resetting of the one second interval timer (552), one or more transmitter carrier cycles are generated (553) until a one second interval elapses (554). Thereafter the "Read Angle Sensor" subroutine of FIGS. 8B through 8D are run. Subsequently a determination is made whether the angle has changed (556) since the last transmission. If the angle has changed, the micro-controller transmits a new angle (558). If the angle has not changed since the last transmission, the transmission is skipped. However, if the angle has not changed for ten samples (557), the angle is nonetheless retransmitted (558). The carrier signal may be interrupted for internal processing purposes.

The operation of the angle sensor will be explained in detail below. Micro-controller U4 controls the ON/OFF switching of transistors Q3-Q10 of FIG. 7 by generating a control signal coupled to the base of each transistor from the processor output pins PA0-PA7, respectively, via current limiting resistors (R-Pack). The switching ON of one of the transistors (559, FIG.

8B) Q3-Q10 pulls the second end of the associated thermistor pair to ground. The junctions between the thermistor pairs are coupled to analog multiplexer U5 which selects one of the junctions as an input to sensing circuitry 670 based on the output signal on pins PB0-PB3 of controller U4 (560, FIG. 8B). Three sections of analog switch U3, i.e. U3B, U3C, U3D, are coupled in parallel between the output of multiplexer U5 and capacitor C11 which is coupled to the non-inverting input of operational amplifier (op-amp) U1B. The opening and closing of switches U3B, U3C, and U3D (which are paralleled for fast charging of C11) is controlled by the output SH of micro-controller U4. The output of op-amp U1B, which is connected as an integrator, is coupled to op-amp U1A and analog switch U3A, which together function as a comparator.

The principle of operation consists of sequentially passing an electric current through each pair of thermistors. "Sequentially" as used herein refers to any predetermined order. In accordance with a preferred embodiment, electric current is passed through each pair of thermistors one pair at a time in a given sequence. In the preferred embodiment, one thermistor of the pair is immersed in liquid 220. As noted above, liquid 220 has a high thermal conductivity and is chemically inert. Both of the thermistors are heated by the current passing through them. However, the thermal conductivity of liquid 220 prevents the thermistor immersed therein from changing temperature as much as the other thermistor in the pair which is not immersed in the liquid. Since the resistance of a thermistor is a function of temperature, the resistances of the above-described thermistor pairs become unbalanced. Thus, the voltage at the junction between the thermistors rises or falls depending on which thermistor is immersed in the liquid. By sensing the junction voltage, the circuitry can determine which thermistor is immersed in the liquid. By examining all the pairs of thermistors, the position of the liquid in the sensor can be determined, thus indicating the direction of acceleration (e.g. of gravity) relative to the axis of the sensor.

When the sensor is not active, micro-controller U4 pulls signal IH high, thereby inhibiting analog multiplexer U5. The micro-controller U4 also pulls signal SH high, thereby closing switches U3B, U3C and U3D. The capacitor C11 is charged to a predetermined voltage of approximately 1.5-1.75 volts by the voltage divider comprising RN1M, RN2B, and RN2H. The output of the integrator U1B also goes to the predetermined voltage as does the output of U1A. Switch U3A is open, and micro-controller U4 senses a high logic level through RN10 at Pin PD7.

When the micro-controller U4 pulls signal T0 high, Q5 turns ON, thereby pulling down signal X0 (559). On the sensor board of FIG. 6, current flows through RT1 and RT9. The micro-controller sets signals A0, A1 and A2 low and pulls signal IH low, connecting signal S0 via connector JP3-JP3' and JP4-JP4' to the output of analog multiplexer U5 (560). This applies the junction voltage to both capacitor C11 and resistor RN2E. Capacitor C11 charges up to the junction voltage and the output of U1B also assumes approximately the same voltage.

After a delay of about five time constants RC (where R is the parallel resistance of U3B, U3C, and U3D and C is the value of C11) to allow sufficient time for C11 to charge up to the thermistor junction voltage, micro-controller U4 opens switches U3B, U3C, and U3D, leaving the stored charge on C11 as a reference point.

Assuming that one of the thermistors is in the liquid and one is not, the junction voltage will now change. The new voltage is applied to the inverting input of U1B through resistor RN2E. Since the non-inverting input still sees the voltage stored on C11, the voltage difference is amplified and inverted at the output of U1B. The output of U1A, which is connected as a Schmitt trigger, follows the polarity of this difference and activates switch U3A, sending a signal to micro-controller U4 at Pin PD7.

After a delay selected for the thermal properties of the thermistors, the micro-controller uses the polarity of the output of U3A as an indication of the direction of unbalance of the thermistor pair.

The above-described process is repeated (562, FIG. 8B) for each of the pairs of thermistors. For example, micro-controller U4 may sequentially pull signals $T_1$, $T_2$, ..., $T_7$ high to determine which thermistor of the thermistor pairs RT2, RT9; RT3, RT10; ...; RT8, RT16 is immersed in the liquid. After each of the pairs of thermistors has been tested, the flags are examined to compute the angle code (563). Since the thermistors are in a fixed relationship relative to the drill blade, micro-controller U4 may determine the orientation of the drill blade by determining which of the thermistors are immersed in the liquid. Although the above-described process is implemented in an angle sensor in which one thermistor of each pair is immersed in the fluid, modifications to angle sensors containing more or less fluid will be apparent.

Figure 1:
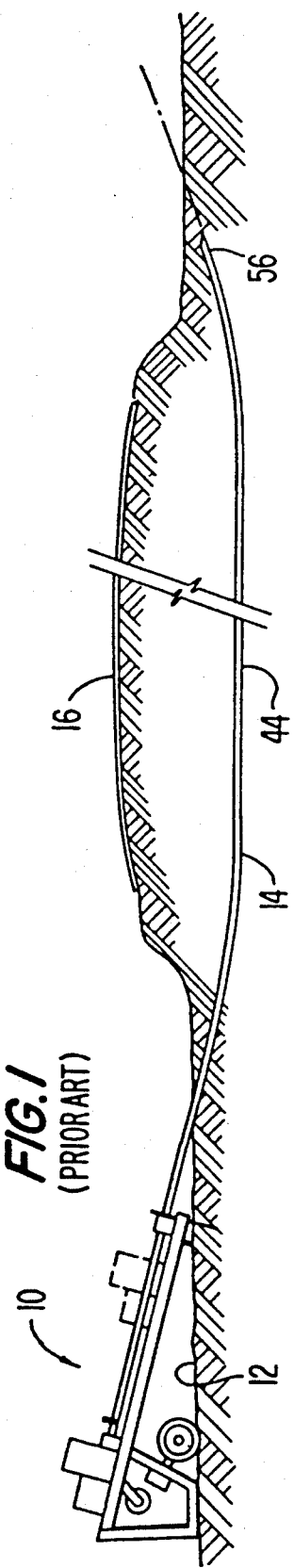
FIG. 1 illustrates a prior art underground drilling apparatus.
Figure 2:
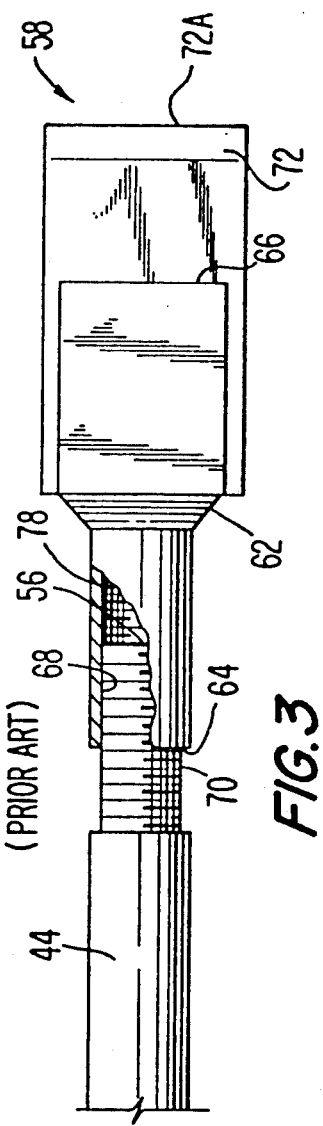
FIGS. 2 and 3 illustrate a prior art steerable drill bit.
Figure 3:
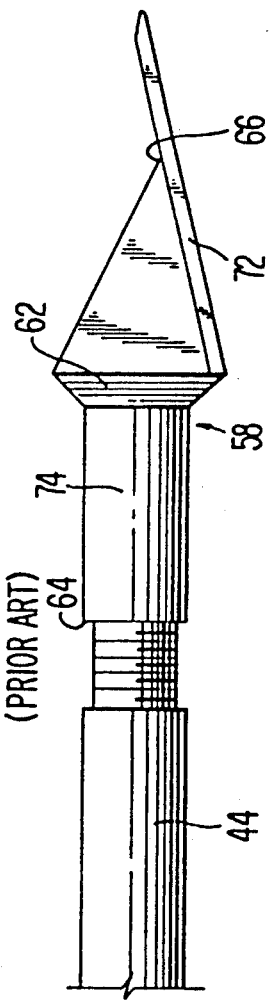

In an arrangement of sixteen thermistors, the angular orientation may be determined to a precision of 22.5° or ±11.25°. For example, suppose the angle sensor is keyed to the drill blade such that the drill blade is angled upwardly or at 0° (i.e., facing downwardly as in FIG. 3) when thermistors 3, 14, 2, 13, 1, 8, 12, and 7 of FIG. 5 are immersed in the liquid. If at some point in time, micro-controller U4 were to determine that thermistors 10, 5, 9, 16, 4, 15, 3, and 14 were immersed in the liquid, the micro-controller would determine that the drill blade had rotated 135°±11.25° from the position defined as 0° assuming a clockwise rotation as suggest by the arrow in FIG. 5.

It will be apparent that other sensing arrangements may be implemented in accordance with the teachings of the present invention and the invention is not limited to the particular sensing circuitry described above. For example sensing circuitry may be designed to interrogate all the thermistor pairs simultaneously or in groups of a predetermined number.

In a preferred embodiment where the liquid level is disposed between the plates of approximately half of the sensors, vibrational forces and the like may cause the fluid to break up so that one or two of the "bottom" sensors do not indicate the presence of liquid. Other additional factors may cause a particular thermistor to fail to register.

FIGS. 8C and 8D are illustrative of a run length procedure for examining various patterns of flag bits such that accurate readings through an averaging technique may be obtained notwithstanding the aforementioned circumstances. For example, in FIG. 8C the longest run of consecutive active sensors with flag bits set low may be determined (570), and if the longest run is greater than half the total of low flags (571), such a determination may be used to determine the true angle code (576). Under some circumstances, however, (572 through 574) the flag bit patterns would be insufficient to determine the true angle code, and an error condition would be indicted (577) thus requiring a new test. Where, however, two longest runs exist and do not appear opposite to each other such as where three consecutive low flag bits are followed by one high and three more low bits, the midpoint would be determined (575), and the true angle code determined (576) after adding in a zero offset constant or the aforementioned "fixed relationship relative to the drill blade."

As illustrated in FIG. 8D, an exemplary procedure for determination of the longest run may be obtained by first zeroing or resetting counters for accumulating indications of the maximum and current run lengths (578 and 579). Thereafter, the initially selected sensor is determined to be either active or inactive (580), and if active and the current run length is zero (581), the position of said sensor is recorded (582). If the current run length is not equal to zero, the current run length is incremented (583). Thereafter, the current run length total is compared with the maximum permissible length (584), and if greater, an error is indicated (577). However, where the error test is negative the exemplary process is stepped (585) so that the next sensor is tested (580). Where the next tested sensor is inactive, it is then known that the current run of active sensors is finished so that all sensors will be inactive. In the latter event, at step 586 the routine would branch to step 591 to determine whether all sensors will be tested inactive or, alternatively, will branch to step 587.

At step 587 a determination is made as to whether the current run length is greater than, equal to, or less than the maximum length. If the current length equals the maximum length, it is known that a new run of active sensors may be instituted and the new position is recorded (589). If the current length is greater than the currently recorded maximum length, the maximum length is set equal to the current length (588), and the maximum position is also set to the current position (590).

In the event that the current length is less than the currently recorded maximum length the exemplary procedure would branch to step 591 for a determination of whether all of the sensors have been tested. Ultimately a determination is made as to the longest run of active sensors as well as a determination of the second longest run, if it exists.

The above noted procedures for obtaining accurate angle codes are merely exemplary and not exhaustive of the procedures which may be used for such determinations under various operating conditions. Clearly other similar or equivalent procedures will occur to those skilled in the art for implementing the above described embodiment.

As noted above, the angle is transmitted from the beacon using a communication system described in the referenced copending application Ser. No. 539,851 entitled "An Improved System For Locating Concealed Underground Objects". The communication system is a digital system and provides an accurate and efficient means for the transmitter to communicate with the receiver. The communication medium is the electromagnetic field produced by the transmitter. Data and associated control bits are encoded by amplitude modulating the carrier frequency. The communication system uses the standard UART (Universal Asynchronous Receiver Transmitter) non-return-to-zero (NRZ) format.

The roll angle is transmitted from the beacon transmitter of FIG. 7 at predetermined periodic intervals. When the above-ground receiver has been set-up in a proper operation mode to receive information from the beacon transmitter, the roll angle information is received and displayed on an angle display of the receiver.

As noted above, the roll angle assumes one of sixteen values ranging from 0° to 360° in increments of 22.5°. It will be appreciated that the number of possible values transmitted from the beacon transmitter is dependent on the precision of angle sensor incorporated therein. A more precise angle sensor will have a greater number of possible angle values.

Figure 9:
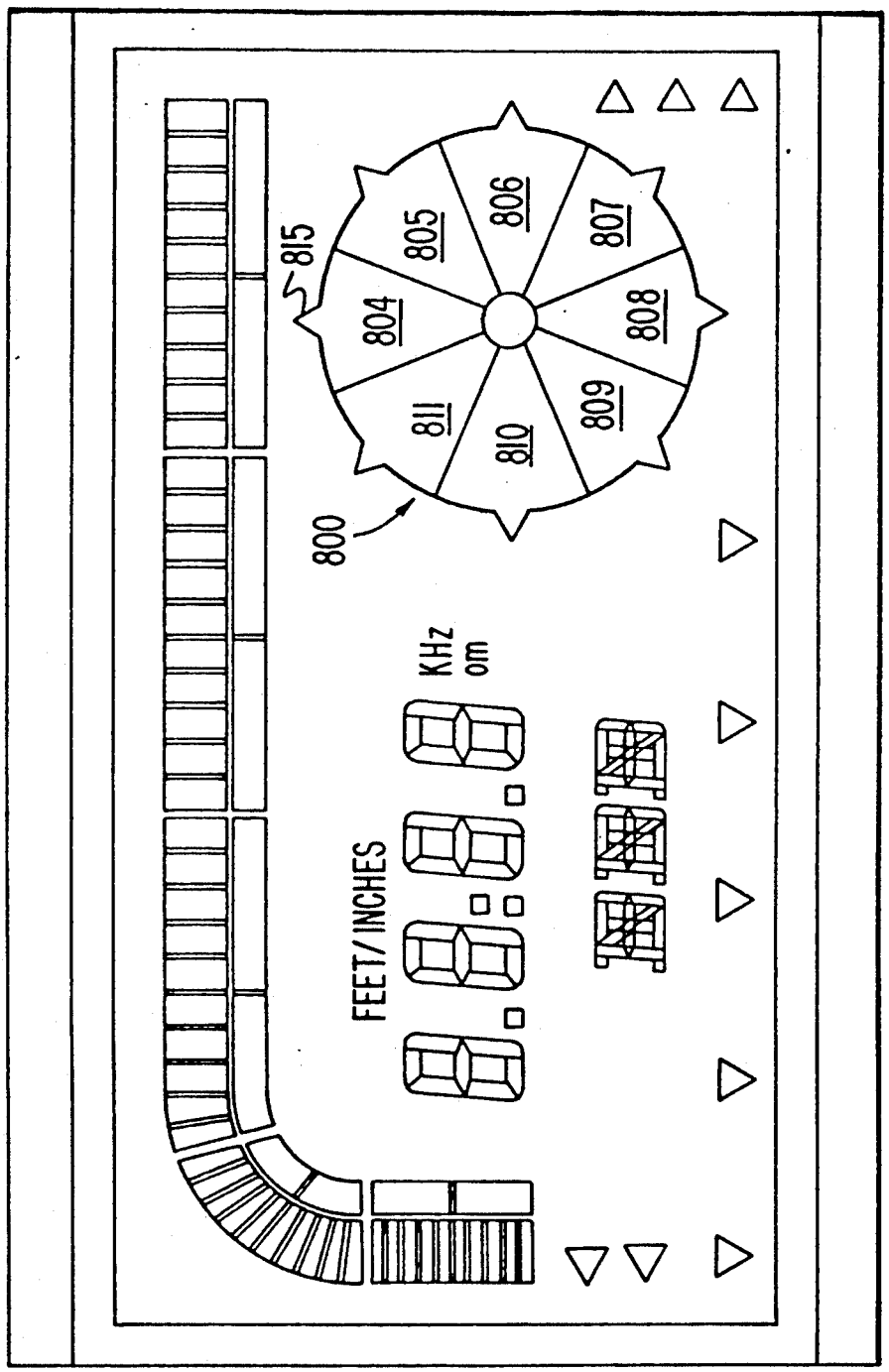
FIG. 9 illustrates an angle display for use with the angle sensor of the present invention.
Figure 10:
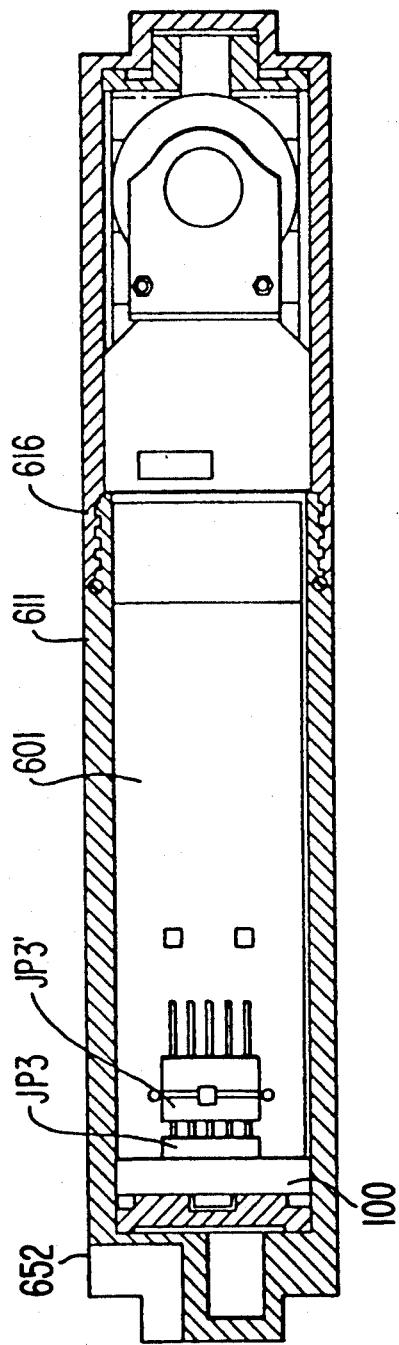
FIG. 10 is a top cross-sectional view of a transmitter housing having the angle sensor and the transmitter disposed therein.
Figure 11:
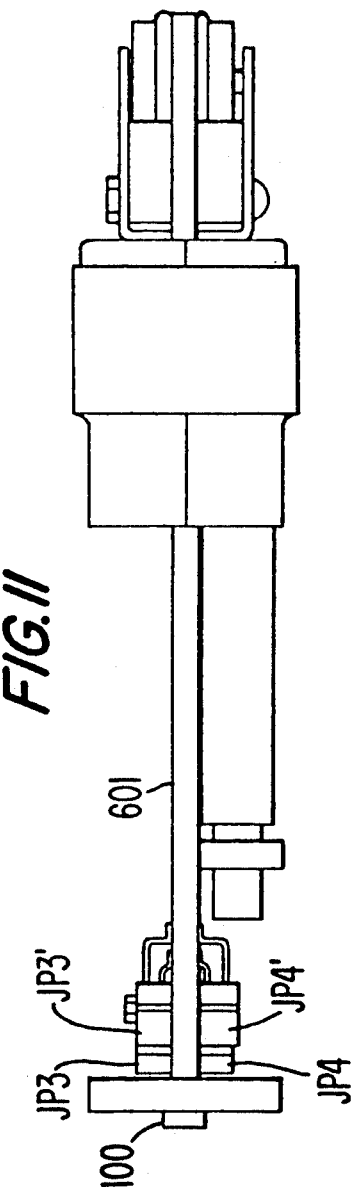
FIG. 11 is a side view of the transmitter and angle sensor of FIG. 10.

FIG. 9 illustrates an angle display of the receiver in accordance with a current embodiment of the invention. Angle display 800 includes eight LCD segments 804-811. Each of the LCD segments 804-811 includes a pointer 815. The pointers are fixed at 0°, 45°, 90°, etc. Each of the LCD segments 804-811 represents an interval of 45°. Thus, display segment 804 indicates angles between −22.5° and +22.5°; display segment 805 between +22.5° and 67.5°; etc. Roll angles which correspond to one of the eight pointer angles are indicated by lighting the corresponding segment. Thus, to indicate an angle of 45°, segment 805 would be lit. The remaining eight intermediate angles are indicated by displaying the two adjacent principal angle segments. Thus, to indicate a roll angle of 22.5°, LCD segments 804 and 805 are illuminated.

It will be recognized that the above-described display is only one example of how the roll angle may be displayed and the invention is not limited in this respect. For example, a LCD digital readout of the roll angle may be provided. Additionally, a sixteen segment LCD may be utilized.

Preferably, an audible or visual indication such as a beep or an indicator light is provided whenever the receiver receives an angle signal from the beacon transmitter. The indication enables the operator to determine that the receiver is in fact continuing to receive angle data from the beacon.

The construction of a drilling assembly including the angle sensor of the present invention will be explained with reference to FIGS. 4 and 10-13. As shown in these Figures, connectors JP3 and JP4 of angle sensor 100 are coupled to connector JP3' and JP4' positioned at one end of PCB 601 of transmitter 600. PCB 601 and angle sensor 100 coupled thereto are positioned inside a two piece transmitter housing 611. The pieces of the transmitter housing are coupled to each other by the use of mating threads 616.

FIGS. 12 and 13 illustrate a drill bit particularly adapted for percussive boring. Drill bit 700 includes a body portion 705 which has a forward end portion 706 and a rearward end portion 707. Reference should be made to the above-identified U.S. Pat. No. 4,907,658 for the details of operatively coupling a drill bit to a mole body and an anvil to permit directional percussive boring. Bit 700 includes an angled cutting face 720. Transmitter housing 611 containing the PCB 601 and angle sensor 100 is positioned within internal opening 701 of bit drill 700 before installation onto a suitably threaded percussion mote such as in U.S. Pat. No. 4,907,658.

The transmitter housing must be positioned within internal opening 701 such that the electrical components or sensing elements have a predetermined relationship to the angled cutting face 720. PCB 601 includes two edge moldings (not shown) about one inch long and centered on the edges of PCB 601. The mouldings engage slots in the transmitter housing 611 to insure that the angle sensor is fixed so as to have a predetermined relationship with outer slotted notch 652 in housing 611. Slotted notch 652 engages a screw 725 which is inserted via opening 731 of steel bit 700 to rotationally fixed all the tool components with respect to the steering feature of the boring tool. Other techniques may be utilized to provide this fixed relationship and the invention is not limited to the technique discussed above.

A second sensor may be positioned in the drill bit to provide an indication of the pitch of the drill blade relative to the horizontal. Pitch of the drill bit may be thought of as rotation of the bit within a vertical plane. The rotation is an arc (partial revolution) of radius which must not violate the allowable bend radius of the drill string, otherwise damage to elements of the drill string may occur. This information is particularly useful when the drill is being deflected upward or downward by obstacles such as rocks or tree roots. Knowledge of pitch angle provides additional information on the orientation of the drill bit, i.e., whether it is level or inclined upward or downward. This knowledge, for example, gives advance warning that the bit has been deflected off course or that the bit is in fact, reacting to an up or down steering correction before the change can actually be detected by monitoring only the depth of the head.

In order to measure roll angle and pitch, the angle sensors may be arranged such that an angle of 90° is established between the axis of the sensors. The pitch angle of the bit or head can best be evaluated when the pitch sensor is approximately vertically oriented (such as within ±45) when the rotational centerline of the drill bit (and transmitter 600) is approximately horizontal. Other means of implementation are possible. It will be appreciated that it may not be necessary to provide a full 360° range for the pitch angle sensor. For example, a range of 180° may be implemented to define a range between up and down. In most cases, a range of 90°(±45° from level) will be sufficient. The pitch angle may be displayed to an operator in a manner similar to that of the roll angle.

Figure 14:
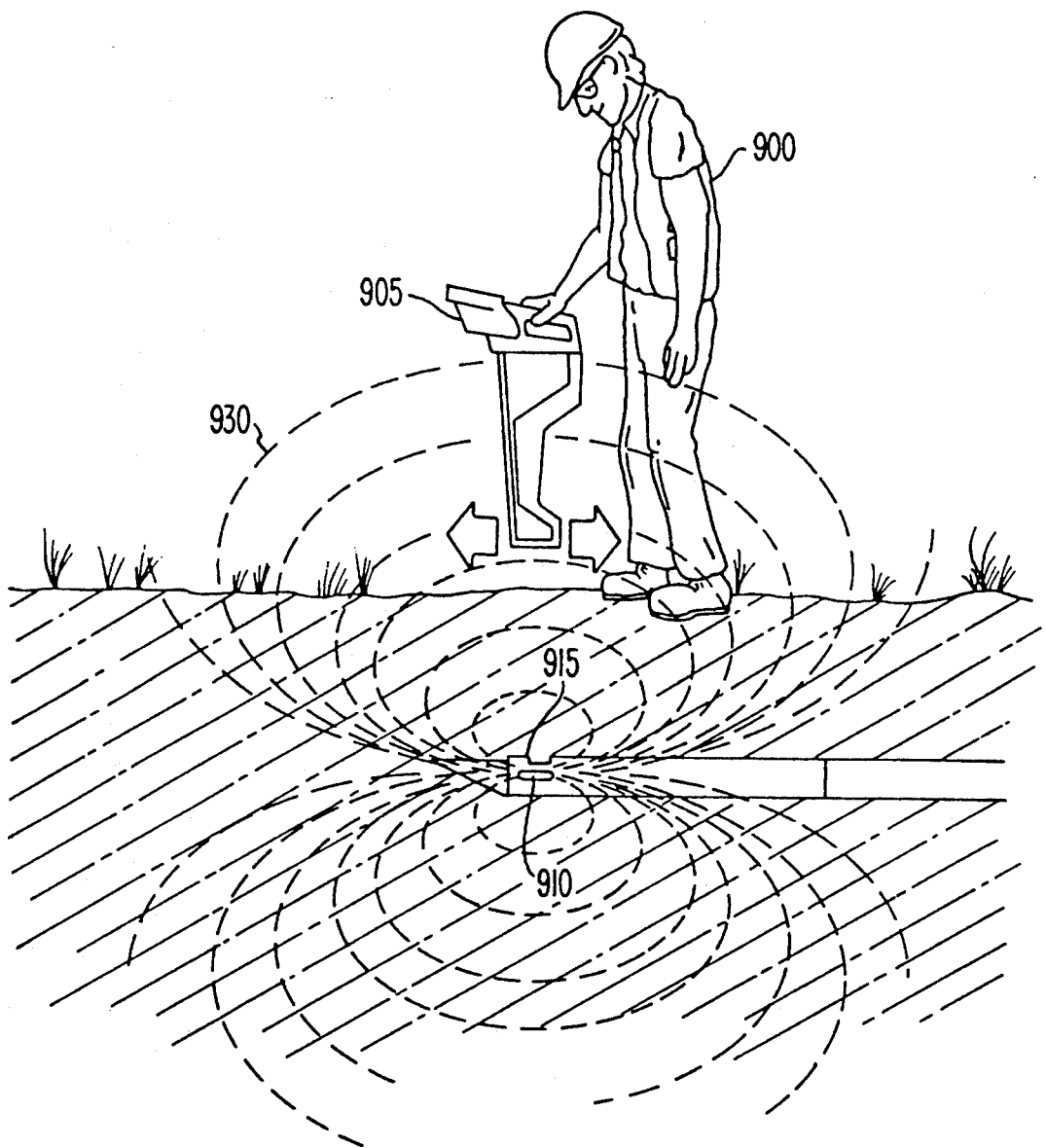
FIG. 14 illustrates a system in which the present invention may be utilized.

As shown in FIG. 14, in practice, an operator 900 utilizes a receiver 905 to receive signals from a transmitter 910 positioned in an underground boring tool 915. The signals emanate from transmitter 910 via window 920 formed in the steel housing of boring tool 915. As illustrated, the field lines 930 produced by the coils of the transmitter are bipolar and axial. The receiver 905 tracks the progress of transmitter 910 as it moves underground or underwater. The receiver has several operating modes, including an active tracking mode in which it is tuned to the frequency of the subsurface transmitter. In this mode, it can locate the boring tool, measure its depth, and display the roll angle or pitch angle.

In accordance with the present invention, a roll sensor having no moving parts may be constructed. Only the liquid moves thus imparting the device high reliability. Another advantage is that the mechanism is compact and simple. This makes it well suited for applications such as sensing tool face angle within a tracking transmitter in the steerable head of a horizontal earthboring machine where very little space is available. Still another advantage of this design is its tolerance of vibration.

While the above-described embodiment has been described and illustrated in terms of a planar array of sensing elements, the present invention is not limited in this respect. The sensing elements may also be arranged in a non-planar array such as paired elements disposed in a predetermined manner within a sphere so as to have a predetermined relationship to the orientation of a member in various planes.

What has been described are the preferred embodiments of the present invention. Other embodiments will be apparent to one of ordinary skill in the art. For example, the it is not necessary that the liquid be of a volume to cover one of each of the thermistors in a thermistor pair. More or less liquid may be utilized. The microcontroller would then be programmed to determine the angle based on the number of thermistors immersed in the liquid. It may also be possible to transmit the angle information to a receiver remote from the location of the drill bit through the use of an appropriate transmitter/receiver system. A wire-based system inside the drillstring could also be used to obtain angle information from the sensor. Although described in conjunction with a steerable underground boring device, it can be appreciated that the angle sensor embodiments may have utility in any number of application. The present invention is not limited to the embodiments described herein but is only limited by the claims appended thereto.

I claim:

1. A sensor for determining an orientation of a member, said sensor comprising:
    a housing;
    an array of thermistor pairs arranged in said housing to have a predetermined relationship to the orientation of said member;
    a fluid contained within said housing for varying an electrical characteristic of a first thermistor relative to a second thermistor in at least one thermistor pair;
    addressing means for addressing said thermistor pairs;
    sensing means coupled to said array of thermistor pairs for sensing differences between the electrical characteristics of the first and second thermistors of addressed thermistor pairs; and
    determining means for determining the orientation of said member in accordance with the sensed differences between the electrical characteristics of the first and second thermistors of said thermistor pairs and the predetermined relationship of said thermistor pairs to the orientation of said member.

2. The sensor according to claim 1 wherein said array of thermistor pairs comprises a circular array of thermistor pairs.

3. The sensor according to claim 2 wherein each thermistor pair comprises a pair of diametrically opposed thermistors.

4. The angle sensor according to claim 1 wherein said fluid covers one thermistor of each thermistor pair at all orientations of said member.

5. The sensor according to claim 2 wherein said circular array of thermistor pairs comprises sixteen thermistors.

6. The sensor according to claim 4 wherein said addressing means comprises addressing means for sequentially addressing each thermistor pair.

7. The angle sensor according to claim 1 wherein said thermistors comprise negative temperature coefficient thermistors.

8. The sensor according to claim 1 wherein said addressing means comprises means for supplying a current to an addressed thermistor pair.

9. The sensor according to claim 8 wherein said sensing means comprises:
means for detecting a voltage at junctions between thermistor pairs, the voltage at said junctions determined by a potential difference between a thermistor covered by said fluid and a thermistor not covered by said fluid; and
means for setting a flag indicative of which thermistor of a thermistor pair is covered by said fluid.

10. The sensor according to claim 9 wherein said determining comprises:
means for examining a sequence of flags; and
means for calculating the orientation of said member in accordance with the sequence of flags and the predetermined relationship of the thermistor pairs to the orientation of said member.

11. The sensor according to claim 1 wherein said fluid covers one thermistor of each thermistor pair.

12. An angle sensor for determining a roll angle of an underground steerable boring tool, said angle sensor comprising:
a circular array of paired thermistors having a predetermined relationship to the roll angle of said underground steerable boring tool, the resistance of each thermistor varying as a function of temperature;
fluid means responsive to the rotation of said underground steerable boring tool for varying the resistance of a first thermistor of each pair relative to the resistance of a second thermistor of each pair;
sensing means coupled to said circular array of paired thermistors for sequentially sensing the resistance of at least one thermistor of each pair of thermistors; and
determining means coupled to said sensing means for determining the roll angle of said underground steerable boring tool in accordance with the resistance of said thermistors sensed by said sensing means and the predetermined relationship of said thermistors to the roll angle of said underground steerable boring tool.

13. The angle sensor according to claim 12 wherein said circular array of paired thermistors comprises sixteen thermistors.

14. The angle sensor according to claim 12 wherein said thermistors comprise negative temperature coefficient thermistors.

15. The angle sensor according to claim 12 wherein each pair of thermistors comprises a pair of diametrically opposed thermistors.

16. An angle sensor for determining a roll angle of a rotatable underground boring tool, said angle sensor comprising:
an array of paired electrical elements which have a predetermined relationship to the roll angle of said boring tool;
means responsive to the rotation of said rotatable underground boring tool for varying the temperature, and thus an electrical characteristic, of a first one of at least one pair of electrical elements relative to the temperature, and thus electrical characteristic, of a second one of the at least one pair of electrical elements;
sensing means coupled to said array of paired electrical elements for sensing the electrical characteristic of at least one electrical element of each pair of electrical elements; and
determining means coupled to said sensing means for determining the roll angle of said underground boring tool in accordance with the electrical characteristics of said electrical elements sensed by said sensing means and the predetermined relationship of said electrical elements to the roll angle of said underground boring tool.

17. The angle sensor according to claim 16 wherein said array of electrical elements comprises a circular array of electrical elements.

18. The angle sensor according to claim 17 wherein each pair of electrical elements comprises a pair of diametrically opposed electrical elements.

19. The angle sensor according to claim 16 wherein said means responsive to the rotation of said underground boring tool comprises a liquid.

20. The angle sensor according to claim 19 wherein said liquid covers one electrical element of each pair of electrical elements at all roll angles.

21. The angle sensor according to claim 16 wherein said electrical elements comprise thermistors.

22. The angle sensor according to claim 17 wherein said circular array of electrical elements comprises sixteen electrical elements.

23. The angle sensor according to claim 20 wherein said sensing means sequentially senses the electrical characteristic of said electrical elements to determine which one of each of the pairs is covered with said liquid.

24. The angle sensor according to claim 16 wherein the electrical characteristic which varies as a function of temperature is resistance.

25. The angle sensor according to claim 21 wherein said thermistors comprise negative temperature coefficient thermistors.

26. A sensing device for determining an orientation of a member, said sensing device comprising at least two angle sensors, each angle sensor comprising a housing; an array of thermistor pairs arranged in said housing to have a predetermined relationship to the orientation of said member in a respective plane; a fluid contained within said housing for varying an electrical characteristic of a first thermistor relative to a second thermistor in at least one thermistor pair; addressing means for addressing said thermistor pairs; sensing means coupled to said array of paired thermistor pairs for sensing differences between the electrical characteristics of the first and second thermistors of addressed thermistor pairs; and determining means for determining the orientation of said member in the respective planes in accordance with the sensed differences between the electrical characteristics of the first and second thermistors of said thermistor pairs and the predetermined relationship of said arrays to the orientation of said member in the respective planes.

27. The sensing device according to claim 26 wherein said array of thermistor pairs comprises a circular array of thermistor pairs.

28. The sensing device according to claim 27 wherein each thermistor pair comprises a pair of diametrically opposed thermistors.

29. The sensing device according to claim 27 wherein said circular array of thermistor pairs comprises sixteen thermistors.

30. The sensing device according to claim 25 wherein said addressing means comprises addressing means for sequentially addressing each thermistor pair.

31. The sensing device according to claim 26 wherein said thermistors comprise negative temperature coefficient thermistors.

32. A method of determining an orientation of a member, said method comprising the steps of:
  (a) arranging an array of thermistor pairs to have a predetermined relationship to the orientation of said member;
  (b) varying an electrical characteristic of a first thermistor relative to a second thermistor in at least one thermistor pair in response to movement of said member;
  (c) addressing said thermistor pairs;
  (d) sensing differences between the electrical characteristics of the first and second thermistors of addressed thermistor pairs; and
  (e) determining the orientation of said member in accordance with the sensed differences between the electrical characteristics of the first and second thermistors of said thermistor pairs and the predetermined relationship of the thermistor pairs to the orientation of said member.

33. The method according to claim 32 wherein step (a) comprises arranging said thermistor pairs in a circular array.

34. The method according to claim 33 wherein each thermistor pair comprises a pair of diametrically opposed thermistors.

35. The method according to claim 33 wherein said circular array of thermistor pairs comprises sixteen thermistors.

36. The method according to claim 32 wherein step (c) comprises sequentially addressing each thermistor pair.

37. The method according to claim 32 wherein the electrical characteristic which varies as a function of temperature is resistance.

38. The method according to claim 32 wherein said thermistors comprise negative temperature coefficient thermistors.

39. The method according to claim 38 wherein step (c) comprises sequentially addressing each thermistor pair.

40. The method according to claim 38 wherein said thermistors comprise negative temperature coefficient thermistors.

41. A method of determining an orientation of a member, said method comprising the steps of:
  (a) arranging at least two arrays of thermistor pairs to have a predetermined relationship to the orientation of said member in a respective plane;
  (b) varying an electrical characteristic of a first thermistor relative to a second thermistor in at least one thermistor pair in response to movement of the member;
  (c) addressing said thermistor pairs in each of said arrays of thermistor pairs;
  (d) sensing differences between the electrical characteristics of the first and second thermistors of addressed thermistor pairs in each of said arrays of thermistor pairs; and
  (e) determining the orientation of said member in accordance with the sensed differences between the electrical characteristics of the first and second thermistors of said thermistor pairs and the predetermined relationship of the thermistor pairs to the orientation of said member in the respective planes.

42. The method according to claim 41 wherein step (a) comprises arranging said thermistor pairs in circular arrays.

43. The method according to claim 41 wherein each thermistor pair comprises a pair of diametrically opposed thermistors.

44. The method according to claim 41 wherein said arrays of thermistor pairs each comprise sixteen thermistors.

45. In an underground steerable boring system having boring means for boring an underground borehole, said boring means including control means for controlling the direction of said boring means, the improvement comprising:
  (a) an angle sensor for determining the orientation of said control means, said angle sensor comprising:
    (i) a circular array of paired thermistors having a predetermined relationship to said control means, the resistance of each thermistor varying as a function of temperature;
    (ii) fluid means responsive to the orientation of said underground steerable boring tool for varying the resistance of a first thermistor of each pair relative to the resistance of a second thermistor of each pair;
    (iii) sensing means coupled to said circular array of paired thermistors for sequentially sensing the resistance of at least one thermistor of each pair of thermistors; and
    (iv) determining means coupled to said sensing means for determining the orientation of said control means in accordance with the resistance of said thermistors sensed by said sensing means and the predetermined relationship of said thermistors to said control means of said underground steerable boring tool;
  (b) transmitting means coupled to said angle sensor for transmitting a signal including the orientation of said control means; and
  (c) receiving means for receiving the signal transmitted from said transmitting means.

46. The underground steerable boring system in accordance with claim 45 further comprising:
  visual display means for visually displaying the orientation of said steering control means.

47. The underground steerable boring system in accordance with claim 46 wherein said visual display means comprises a liquid crystal display.

48. A method of providing an orientation of an underground boring tool to an operator, said method comprising the steps of:
  (a) arranging an array of paired electrical components in a predetermined manner so as to have a predetermined relationship to the orientation of the underground boring tool, each electrical component having an electrical characteristic which varies as a function of temperature;
  (b) varying the electrical characteristic of a first one of each pair of electrical components relative to the electrical characteristic of a second one of each pair of electrical components in response to movement of said boring tool;

(c) comparing the electrical characteristic of the first one of each pair of electrical components and the electrical characteristic of the second one of each pair of electrical components; and (d) determining the orientation of said rotatable member in accordance with the comparisons of step (c) and the predetermined relationship of the electrical components to the orientation of said member;

(e) transmitting a signal including the orientation of said underground boring tool;

(f) receiving the transmitted signal; and (g) displaying the orientation to said operator.

49. A sensor for determining an orientation of a member, said sensor comprising:

a housing;

thermistor pairs arranged on a wall of said housing to have a predetermined relationship to the orientation of said member;

a fluid contained in said housing, said fluid covering one thermistor of at least one thermistor pair;

addressing means for addressing said thermistor pairs;

sensing means for sensing which thermistor of a thermistor pair is covered with said fluid; and determining means for determining the orientation of said member in accordance with which thermistors are covered with said fluid and the predetermined relationship of said thermistor pairs to the orientation of said member.

50. The sensor according to claim 49 wherein said fluid comprises a liquid having high thermal conductivity.

51. The sensor according to claim 49 wherein said addressing means comprises addressing means for sequentially addressing said thermistor pairs.

52. The sensor according to claim 49 wherein said addressing means comprises means for supplying a current to an addressed thermistor pair.

53. The sensor according to claim 52 wherein said sensing means comprises:

means for detecting a voltage at junctions between thermistor pairs, the voltage at said junctions determined by a potential difference between a thermistor covered by said fluid and a thermistor not covered by said fluid; and means for setting a flag indicative of which thermistor of a thermistor pair is covered by said fluid.

54. The sensor according to claim 53 wherein said determining comprises:

means for examining a sequence of flags; and means for calculating the orientation of said member in accordance with the sequence of flags and the predetermined relationship of the thermistor pairs to the orientation of said member.

55. The sensor according to claim 49 wherein said fluid covers one thermistor of each thermistor pair.

56. An underground boring tool, comprising:

a drill bit including a blade portion;

a sensor for determining an orientation of said drill bit, said sensor comprising:

a housing;

thermistor pairs arranged on a wall of said housing to have a predetermined relationship to the orientation of said member;

a fluid contained in said housing, said fluid covering one thermistor of at least one thermistor pair;

addressing means for addressing said thermistor pairs;

sensing means for sensing which thermistor of a thermistor pair is covered with said fluid; and determining means for determining the orientation of said member in accordance with which thermistors are covered with said fluid and the predetermined relationship of said thermistor pairs to the orientation of said member; and a transmitter for transmitting a signal at least including said orientation.

57. The sensor according to claim 56 wherein said addressing means comprises means for supplying a current to an addressed thermistor pair.

58. The sensor according to claim 57 wherein said sensing means comprises:

means for detecting a voltage at junctions between thermistor pairs, the voltage at said junctions determined by a potential difference between a thermistor covered by said fluid and a thermistor not covered by said fluid; and means for setting a flag indicative of which thermistor of a thermistor pair is covered by said fluid.

59. The sensor according to claim 58 wherein said determining comprises:

means for examining a sequence of flags; and means for calculating the orientation of said member in accordance with the sequence of flags and the predetermined relationship of the thermistor pairs to the orientation of said member.

* * * * *